(12) United States Patent
Chaudhuri et al.

(10) Patent No.: US 8,458,380 B2
(45) Date of Patent: Jun. 4, 2013

(54) OFF-LINE TASK LIST ARCHITECTURE UTILIZING TIGHTLY COUPLED MEMORY SYSTEM

(75) Inventors: Arunava Chaudhuri, San Diego, CA (US); Iwen Yao, San Diego, CA (US); Jeremy H. Lin, San Diego, CA (US); Remi Gurski, San Diego, CA (US); Kevin W. Yen, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 111 days.

(21) Appl. No.: 12/396,217

(22) Filed: Mar. 2, 2009

(65) Prior Publication Data

US 2009/0248920 A1 Oct. 1, 2009

Related U.S. Application Data

(60) Provisional application No. 61/039,774, filed on Mar. 26, 2008, provisional application No. 61/040,654, filed on Mar. 29, 2008.

(51) Int. Cl.
*G06F 3/00* (2006.01)
*G06F 9/46* (2006.01)

(52) U.S. Cl.
USPC ............................................ 710/52; 718/102

(58) Field of Classification Search
USPC ............................................ 710/52; 718/102
See application file for complete search history.

(56) References Cited

U.S. PATENT DOCUMENTS

| 5,790,817 | A | 8/1998 | Asghar et al. |
| 5,968,167 | A | 10/1999 | Whittaker et al. |
| 6,125,404 | A | 9/2000 | Vaglica et al. |
| 6,128,307 | A | 10/2000 | Brown |
| 6,259,371 | B1 | 7/2001 | Chang |
| 6,292,887 | B1 | 9/2001 | Janniello |
| 6,560,715 | B1 | 5/2003 | Bourdillat et al. |

(Continued)

FOREIGN PATENT DOCUMENTS

| JP | 2006135707 A | 5/2006 |
| JP | 2006221638 A | 8/2006 |

(Continued)

OTHER PUBLICATIONS

Definition of 'queue', 2003, Wiley Publishing, Inc.*

(Continued)

*Primary Examiner* — Hyun Nam
(74) *Attorney, Agent, or Firm* — Abdollah Katbab

(57) ABSTRACT

A flexible and reconfigurable digital system (for example, a wireless modem) includes a set of sub-circuits. Each sub-circuit includes a task manager and an amount of configurable hardware circuitry for performing a type of operation on a data stream. The task manager of a sub-circuit can configure and control the configurable hardware of the sub-circuit. A central processor configures and orchestrates operation of the sub-circuits by maintaining a set of task lists in a tightly coupled memory. Each task list includes task instructions for a corresponding sub-circuit. The task manager of a sub-circuit reads task instructions from its task list and controls its associated hardware circuitry as directed by the instructions. A timestamp task instruction and a push task instruction and the task list architecture allow modem sub-circuits to be easily reconfigured to operate in accordance with either a first air interface standard or a second air interface standard.

30 Claims, 23 Drawing Sheets

U.S. PATENT DOCUMENTS

| | | |
|---|---|---|
| 6,577,678 B2 | 6/2003 | Scheuermann |
| 7,096,288 B2 | 8/2006 | Liao et al. |
| 7,240,231 B2 | 7/2007 | Conway |
| 7,937,591 B1 | 5/2011 | Master et al. |
| 2003/0110420 A1 | 6/2003 | Smith et al. |
| 2004/0008715 A1* | 1/2004 | Barrack et al. ............... 370/429 |
| 2004/0187122 A1* | 9/2004 | Gosalia et al. ............... 718/100 |
| 2004/0208181 A1* | 10/2004 | Clayton et al. ............ 370/395.4 |
| 2005/0223382 A1 | 10/2005 | Lippett |
| 2006/0120495 A1 | 6/2006 | Barber et al. |
| 2006/0179436 A1 | 8/2006 | Yasue |
| 2006/0181393 A1 | 8/2006 | Raphaeli |
| 2007/0174841 A1 | 7/2007 | Chamberlain et al. |
| 2007/0220517 A1* | 9/2007 | Lippett ........................ 718/102 |
| 2008/0003969 A1 | 1/2008 | Segev et al. |
| 2008/0036969 A1 | 2/2008 | Otsuka et al. |
| 2008/0215650 A1 | 9/2008 | Tsatsanis et al. |
| 2009/0245192 A1 | 10/2009 | Chaudhuri et al. |
| 2009/0245334 A1 | 10/2009 | Chaudhuri et al. |

FOREIGN PATENT DOCUMENTS

| | | |
|---|---|---|
| JP | 2006270910 A | 10/2006 |
| JP | 2007221385 A | 8/2007 |
| TW | 200525999 | 8/2005 |
| TW | M273772 U | 8/2005 |

OTHER PUBLICATIONS

Definition of 'circuit', 2000, Houghton Miffin Company.*

International Search Report & Written Opinion—PCT/US2009/036437, International Search Authority—European Patent Office—Nov. 17, 2009.

International Search Report & Written Opinion—PCT/US2009/036438, International Search Authority—European Patent Office—Jul. 20, 2009.

Je-Hoon Lee et al: "Implementation of IEEE 802.11a WLAN Baseband Processor" Consumer Electronics, 2007. ICCE 2007. Digest of Technical Papers. International Conference on, IEEE, PI, Jan. 1, 2007, pp. 1-2, XP031071649 ISBN: 978-1-4244-0762-0 the whole document.

Krashinsky R et al: "The vector-thread architecture" Computer Architecture, 2004. Proceedings. 31st Annual International Symposium on Munchen, Germany Jun. 19-23, 2004, Piscataway, NJ, USA,IEEE, Jun. 19, 2004, pp. 52-63, XP010769402 ISBN: 978-0-7695-2143-5 figures 1,3,4,6 p. 1-4 abstract.

Taiwan Search Report—TW098109280—TIPO—Jul. 30, 2012.

* cited by examiner

TASK LIST (ALL TASKS COMPLETED)

TASK LIST (ONE NEW TASK TO DO)

PROCESSOR TASK LIST PREPARATION
AND MAINTENANCE

TASK MANAGER OPERATION

TIMESTAMP TASK INSTRUCTION EXECUTION

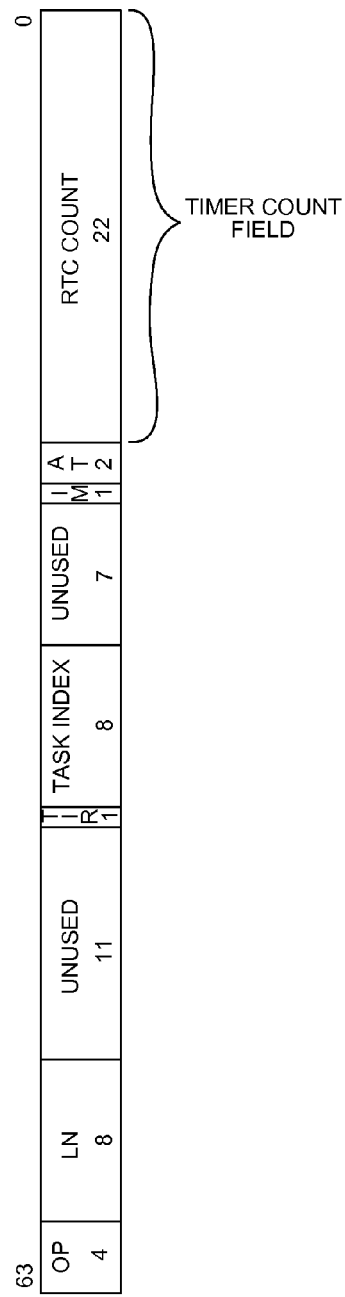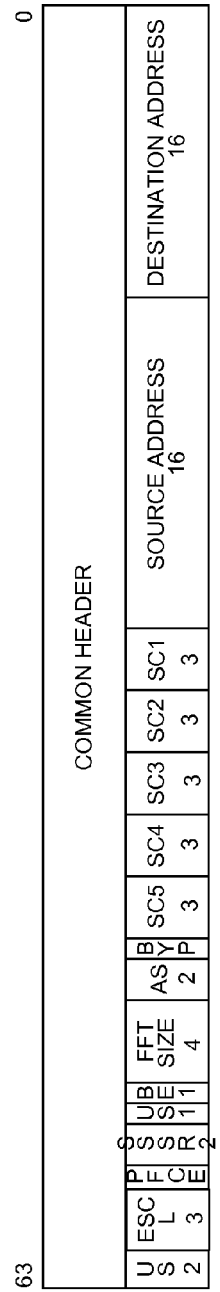
COMMON HEADER
(FOR ALL TASK INSTRUCTIONS)
FIG. 12A
FFT TASK
FIG. 12B

FIG. 12C — SAMPLE BUFFER PUSH TASK

FIG. 12D — FFT AND SAMPLE BUFFER PUSH TASK

SYMBOL BUFFER PUSH TASK

| 0 | | | | | | | 63 |
|---|---|---|---|---|---|---|---|
| COMMON HEADER | | | | | | | |
| DEMOD_TONE_MASK[127:64] | | | | | | | |
| DEMOD_TONE_MASK[63:0] | | | | | | | |
| PHASE ROT 0 REAL 9 | PHASE ROT 0 IMAG 9 | PHASE ROT 1 REAL 9 | PHASE ROT 1 IMAG 9 | PHASE ROT 2 REAL 9 | PHASE ROT 2 IMAG 9 | UNUSED 10 | |
| PHASE ROT 3 REAL 9 | PHASE ROT 3 IMAG 9 | PHASE ROT 4 REAL 9 | PHASE ROT 4 IMAG 9 | PHASE ROT 5 REAL 9 | PHASE ROT 5 IMAG 9 | UNUSED 10 | |
| PHASE ROT 6 REAL 9 | PHASE ROT 6 IMAG 9 | PHASE ROT 7 REAL 9 | PHASE ROT 7 IMAG 9 | UNUSED 28 | | | |
| TILE WIDTH 5 | TILE LENGTH 5 | NUM SUB TILES 3 | UNUSED 3 | SUBTILE START PATTERN 16 | OFDM OFFSET (SRC ADDRESS OFFSET) 16 | LAYER2_OFFSET 22 | |

DEMOD CONFIG TASK
(CONFIGURATION TASK INSTRUCTION)

FIG. 12F

| COMMON HEADER | | | | |
|---|---|---|---|---|
| UNUSED 28 | SMTDE / MMO / SO2 / DE | TILE BUFFER DESTINATION ADDRESS 16 | | SYMBOL BUFFER SOURCE ADDRESS 16 |
| S0 W12 IMAG | S0 W12 REAL | S0 W22 REAL | U U 2 | S0 W11 REAL |
| UNUSED 29 | S0 BETA SQ 9 | S0 W21 IMAG | U U 2 | S0 W21 REAL |
| S0 CI_DC21 IMAG | S0 CI_DC21 REAL | S0 CI_DC11 REAL | U U 2 | S0 CI_DC11 REAL |
| U U 1 | U U 1 | U U 1 | | U U 1 |
| S0 CI_DC22 IMAG | S0 CI_DC22 REAL | S0 CI_DC12 REAL | U U 1 | S0 CI_DC12 REAL |
| U U 1 | U U 1 | U U 1 | | U U 1 |
| S0 CI_DF21 IMAG | S0 CI_DF21 REAL | S0 CI_DF11 REAL | U U 1 | S0 CI_DF11 REAL |
| U U 1 | U U 1 | U U 1 | | U U 1 |
| S0 CI_DF22 IMAG | S0 CI_DF22 REAL | S0 CI_DF12 REAL | U U 1 | S0 CI_DF12 REAL |
| U U 1 | U U 1 | U U 1 | | U U 1 |
| S0 CI_DT21 IMAG | S0 CI_DT21 REAL | S0 CI_DT11 REAL | U U 1 | S0 CI_DT11 REAL |
| U U 1 | U U 1 | U U 1 | | U U 1 |
| S0 CI_DT22 IMAG | S0 CI_DT22 REAL | S0 CI_DT12 REAL | U U 1 | S0 CI_DT12 REAL |
| U U 1 | U U 1 | U U 1 | | U U 1 |

REPEAT FOR UP TO 5 SUB-TILES, S0, S1,...,S4

DEMOD MMSE TASK

FIG. 12G

| COMMON HEADER | | | | |
|---|---|---|---|---|
| UNUSED 28 | S M T S D E 2 | U U 2 | SYMBOL BUFFER SOURCE ADDRESS 16 | 0 |
| | S0 W12 REAL | U U 2 | TILE BUFFER DESTINATION ADDRESS 16 | |
| | | U U 2 | S0 W11 REAL | |
| UNUSED 29 | S0 BETA SQ 9 | U U 2 | S0 W22 REAL | |
| S0 W12 IMAG | | U U 2 | S0 W21 REAL | |
| | | U U 2 | S0 W21 IMAG | |
| S0 CI_DC21 REAL | | U U 1 | S0 CI_DC11 REAL | |
| S0 CI_DC21 IMAG | | U U 1 | S0 CI_DC11 REAL | |
| S0 CI_DF21 REAL | | U U 1 | S0 CI_DF11 REAL | |
| S0 CI_DF21 IMAG | | U U 1 | S0 CI_DF11 REAL | |
| S0 CI_DT21 REAL | | U U 1 | S0 CI_DT11 REAL | |
| S0 CI_DT21 IMAG | | U U 1 | S0 CI_DT11 REAL | 63 |

REPEAT FOR UP TO 5 SUB-TILES, S0,S1,...,S4

DEMOD MRC TASK

FIG. 12H

DDE CONFIG TASK

FIG. 12J — DDE CLEAR LLR TASK

| COMMON HEADER | | | | |
|---|---|---|---|---|
| UNUSED 12 | CR 3 | TV 1 | NUMBER OF CODED SYMBOLS 16 | UNUSED 8 | STARTING ADDRESS 24 |

FIG. 12K — DDE PUSH TASK

| COMMON HEADER |
| CODE SYMBOL OFFSET 16 | NUMBER OF CODED SYMBOLS 16 | MPO 2 | SP INDEX 8 | LLR BUF DESTINATION ADDRESS 24 |
| OTHER CONFIGURATION 26 | PBRI STATE 16 | DESCRAMBLER STATE 20 |
| UNUSED 32 | DEMAP PUSH TCM DESTINATION ADDRESS 32 |
| SOURCE ADDRESS IN LLR BUFFER LLR_START_PTR 24 | US 2 | SP SIZE 14 | DECODE PUSH TCM DESTINATION ADDRESS 32 |
| UNUSED 8 | DECODE OUTPUT BUFFER DESTINATION ADDRESS 16 | UNUSED 4 | SUB IDX 8 | ABIST 1 | LLSP 1 | LFTP 1 | PSH 2 | ALR YM 1 | MI NU TM 6 | CRC 3 | R 3 | TASK INDEX 8 |
| CRC POLYNOMIAL 32 | UNUSED 7 | MIN_I 4 | MAX_I 4 | ET2 4 | ETE 4 | BETA 4 |

FFT WCSMSC OPERATION IN AN LTE EXAMPLE
(PROCESSING OF ONE SLOT)

TASK LIST FOR THE FFT WCSMSC IN A LTE EXAMPLE
(PROCESSING OF ONE SLOT)

OFF-LINE TASK LIST ARCHITECTURE UTILIZING TIGHTLY COUPLED MEMORY SYSTEM

CROSS-REFERENCE TO RELATED APPLICATIONS

This application claims the benefit under 35 U.S.C. §119 of Provisional Application Ser. No. 61/039,774, filed Mar. 26, 2008, and Provisional Application Ser. No. 61/040,654, filed Mar. 29, 2008, said provisional applications are incorporated herein by reference.

BACKGROUND INFORMATION

1. Technical Field

The present disclosure relates to the control of digital system involving a number of sub-circuits that operate together to process a data stream, and more particularly the present disclosure relates to the control of wireless modem sub-circuits using off-line task lists.

2. Background Information

Digital data processing systems sometimes involve a large number of operations that can broken down in several smaller sub-operations. In one technique, such as a technique commonly employed in wireless communication system modulator/demodulator (MODEM) integrated circuits, a separate dedicated hardware circuit is designed to perform each of the various sub-operations. The separate dedicated hardware circuits are controlled by a central processor. Often there is a main data path through the various separate dedicated hardware circuits. The software executing on the processor operates in conjunction with a real time clock (RTC). At certain time intervals as determined by the real time clock, the software causes the processor to configure or control various ones of the hardware circuits such that the hardware circuits process data in the data stream in a desired way. The processor may be alerted of certain conditions using interrupts. For example, the processor may learn through an interrupt that a particular hardware circuit has completed processing of data, and in response to this interrupt the processor may start a subsequent hardware circuit processing the data. The processor may be called upon to do exception handling.

FIG. 1 (Prior Art) is a simplified block diagram of a part of a receive channel of a wireless MODEM integrated circuit 1. In this integrated circuit, processor 2 executes code out of a memory 3 and configures the various hardware circuits 3-8. To configure an integrated circuit, the processor 2 writes configuration information across bus 9 into configuration registers in the hardware circuit to be configured. Reference numeral 10 identifies a set of configuration/control registers in hardware circuit 4. The processor 2 also typically controls the various hardware circuits. The processor 2 may, for example, start operation of a hardware circuit or change its operation by writing control information into control registers of the hardware circuit. The processor may also read selected data being output by a hardware circuit via bus 9, make a determination based on the data, and then change the way one or more of the hardware circuits operate based on the data by writing configuration/control information into selected configuration/control registers across bus 9. The individual hardware circuits 4-8 also typically alert processor 2 to particular conditions via interrupts communicated across lines 11. In one example, a particular hardware circuit is to begin performing a particular operation at a particular time. Software execution jumps from executing a main routine 12 to an appropriate one of interrupt sub-routines 13-15 in response to an interrupt signal received from a real time clock 16. The processor 2, upon executing the sub-routine, configures or controls the particular hardware circuit as required shortly following the time of the interrupt. The various hardware circuits 4-8 can therefore be controlled to perform desired functions in response to certain events or at certain times as directed by processor 2.

Although the architecture of FIG. 1 operates well in many applications and has advantages, it also has certain shortcomings. For example, processor 2 may be throughput constrained, and writing across a bus such as bus 9 may be undesirably slow. This problem may be amplified due to the fact that processor 2 may have substantial configuration/control information to write into many configuration/control registers. A second potential problem is that processor 2 may be called on to start operation of more than one hardware circuit at the same time, or at approximately the same time. Processor 2, however, executes instructions sequentially. In one solution to this problem, individual hardware blocks have multiple sets of configuration/control registers. Processor 2 writes into unused sets of configuration/control registers in the hardware circuits in advance, and then at the time that multiple hardware circuits are to be started the processor can write a smaller number of times to initiate operation using the previously supplied configuration/control information in the extra configuration/control registers. Providing the increased number of configuration/control registers required is, however, undesirable.

SUMMARY

In a first aspect, a digital system includes a processor that is tightly coupled to a memory by a first bus. The digital system further includes a set of sub-circuits. Each sub-circuit includes a task manager and an amount of configurable but specialized hardware circuitry for performing a type of data processing. The task manager of a sub-circuit can configure and control the configurable hardware of the sub-circuit. In operation, the processor of the system configures operation of the sub-circuits and orchestrates their operation and timing by maintaining a set of task lists in the memory. Each task list includes task instructions for each corresponding one of the sub-circuits. The task manager of each sub-circuit reads task instructions out of its corresponding task list in the memory across a second bus. Memory accesses of the task manager via the second bus generally have higher memory access latencies than do memory accesses of the processor via the first bus. Having the task managers of the sub-circuits read task instructions out of the memory across the slower second bus offloads the processor of having to conduct many relatively slow transfers across the second bus. Software execution delays due to the processor having to perform reads across the relatively slow second bus are avoided. After a task manager has read a task instruction across the second bus, the task manager interprets the task instruction and causes the associated configurable hardware of the sub-circuit to perform an operation as indicated by the task instruction.

In one example, the task lists may include a "timestamp" type of task instruction. When the task manager of a sub-circuit reads such a timestamp task instruction, the operation indicated by the timestamp task instruction is not performed immediately but rather is initiated at a time indicated by the timestamp. A central wall clock timer provides an indication of current time that is used to determine when the time as indicated by the timestamp has arrived. All the task managers of the sub-circuits refer to one time count standard supplied by the one central wall clock timer. By writing timestamp task instructions into the task lists of the various sub-circuits, the processor can set up beforehand the times when multiple sub-circuits will perform certain operations. In another example, the task lists include push task instructions. Execution of a push task instruction by a sub-circuit causes certain information designated by the push task instruction to be written by the task manager into the memory across the second bus. Once the pushed information is in the memory, the processor can then access the information and use the information to make a determination. The processor may, for example, use the information to change the way sub-circuits perform further processing. The off-line task list architecture described sees general applicability in the design of large digital systems involving multiple sub-circuits. In particular, the off-line task list architecture sees particular applicability in the design of digital systems involving separate hardware processing sub-circuits, the operations of which are to be flexibly controlled and timed with respect to one another such that the sub-circuits function together to process a stream of data.

In a second aspect, wireless communication system modem of a mobile communication device includes a processor that is tightly coupled to a memory by a first bus. The modem also includes a plurality of Wireless Communication System Modem Sub-Circuit (WCSMSCs). Each WCSMSC includes a task manager and an amount of configurable but specialized hardware circuitry for performing a type of data processing. The task manager of a WCSMSC can read task instructions from the memory via a second bus, and can then configure and/or control the configurable hardware of its associated WCSMSC as indicated by the task instructions read. The WCSMSCs together form a reconfigurable wireless modem receive channel. The term receive channel here refers to the baseband hardware receiver processing chain. If the WCSMSCs are configured in a first way as indicated by task instructions stored in the memory then the channel is configured to communicate in accordance with a first air interface standard (for example, LTE), whereas if the WCSMSCs are configured in a second way as indicated by task instructions stored in the memory then the receive channel is configured to communicate in accordance with a second air interface standard (for example, UMB or WiMAX). Timestamp task instructions, push task instructions, hardware event launched task instructions, and other types of task instructions described in the detailed description below are usable in task lists to facilitate reconfiguration of the receive channel (baseband receiver processing chain hardware) without hardware design changes, for example to switch the same modem hardware from receiving communications of one air interface standard to receiving communications of another air interface standard or to accommodate communication standard changes that are made after fabrication of the modem hardware.

The foregoing is a summary and thus contains, by necessity, simplifications, generalizations and omissions of detail; consequently, those skilled in the art will appreciate that the summary is illustrative only and does not purport to be limiting in any way. Other aspects, inventive features, and advantages of the devices and/or processes described herein, as defined solely by the claims, will become apparent in the non-limiting detailed description set forth herein.

BRIEF DESCRIPTION OF THE DRAWINGS

FIG. 12A is a diagram of the common header present in all task instructions.

FIG. 12B is a diagram of the FFT Task instruction.

FIG. 12C is a diagram of the Sample Buffer Push Task instruction.

FIG. 12D is a diagram of the FFT and Sample Buffer Push Task instruction.

FIG. 12F is a diagram of the Demod Config Task instruction.

FIG. 12G is a diagram of the Demod MMSE Task instruction.

FIG. 12H is a diagram of the Demod MRC Task instruction.

FIG. 12J is a diagram of the DDE Clear LLR Task instruction.

FIG. 12K is a diagram of the DDE Push Task instruction.

DETAILED DESCRIPTION

Figure 1:
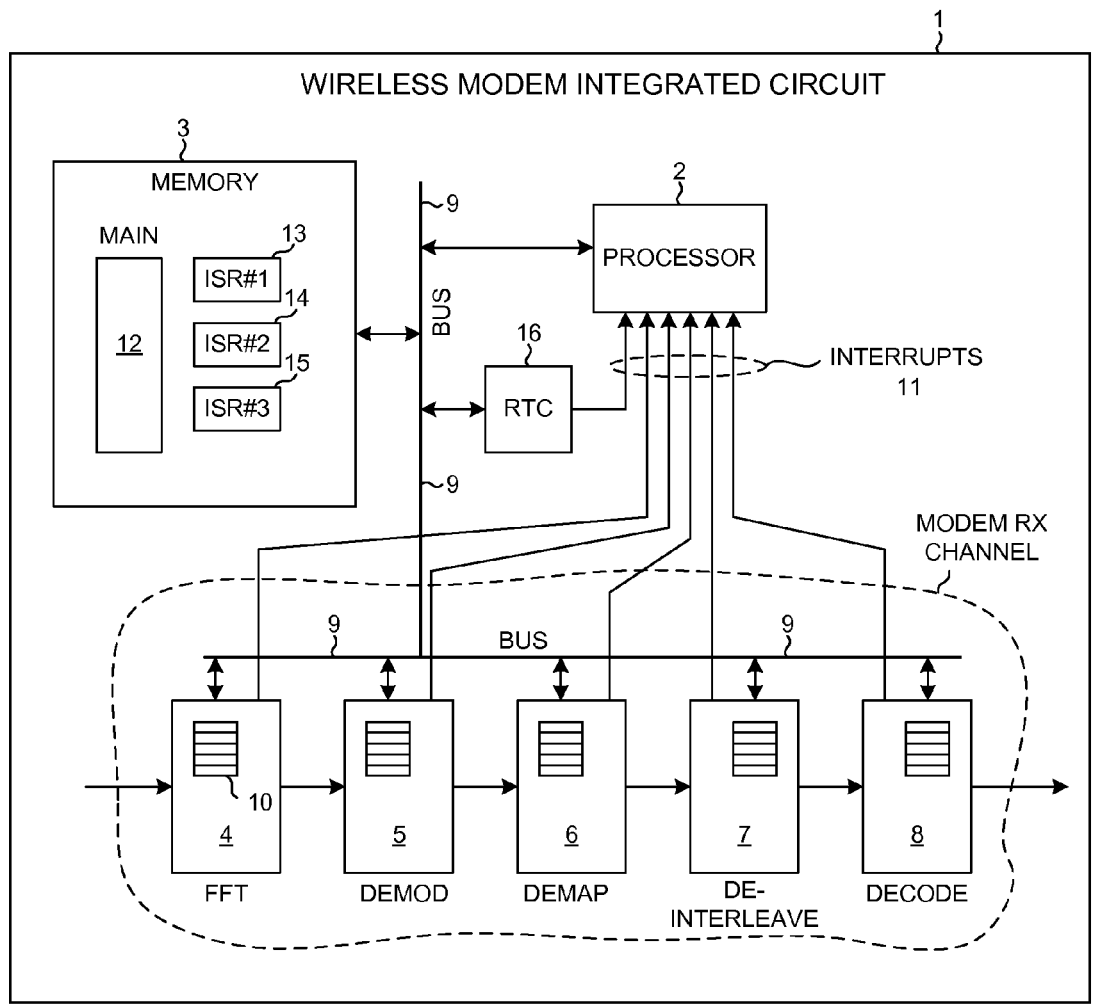
FIG. 1 (Prior Art) is a diagram of a wireless modem integrated circuit employing a conventional wireless modem architecture.
Figure 2:
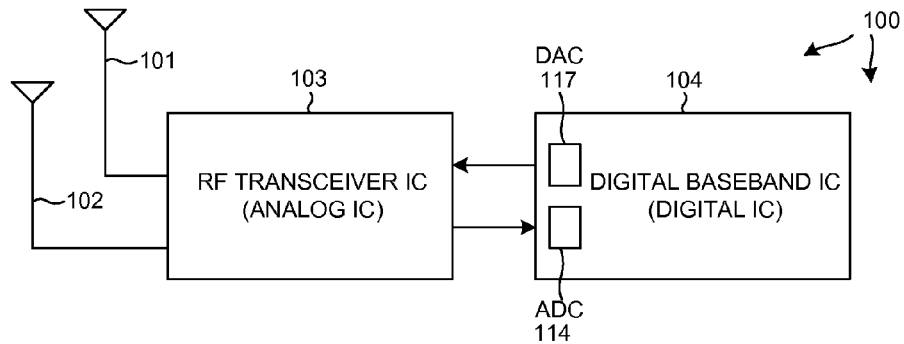
FIG. 2 is a simplified diagram mobile communication device in accordance with one novel aspect.

FIG. 2 is a very simplified high level block diagram of one particular type of mobile communication device 100 in accordance with one aspect. In this particular example, mobile communication device 100 is a cellular telephone. Mobile communication device 100 includes (among several other parts not illustrated) two antennas 101 and 102 and two integrated circuits 103 and 104. Integrated circuit 103 is an RF transceiver integrated circuit. RF transceiver integrated circuit 103 is called a "transceiver" because it includes a transmitter as well as a receiver. RF transceiver integrated circuit 103 is principally an analog integrated circuit involving analog circuitry. Integrated circuit 104, on the other hand, is principally a digital integrated circuit that includes digital circuitry. Integrated circuit 104 is often called a "digital baseband integrated circuit" or a "baseband processor integrated circuit." There are other ways of partitioning the electronics of a mobile communication device, but this is one exemplary way.

Figure 3:
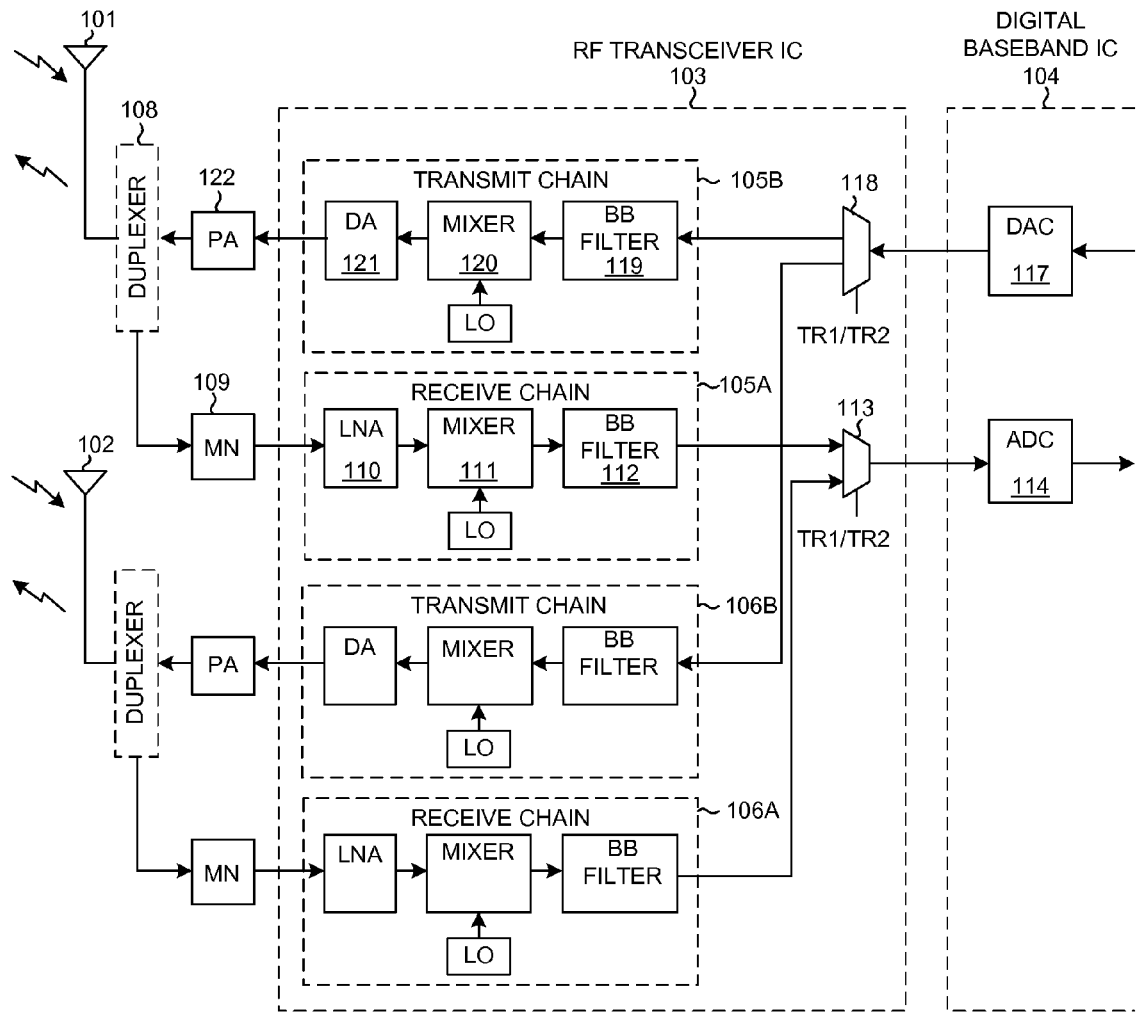
FIG. 3 is more detailed diagram of the RF transceiver integrated circuit 103 of the mobile communication device of FIG. 2.

FIG. 3 is a more detailed block diagram of RF transceiver integrated circuit 103. This particular transceiver includes two transceivers. The first transceiver includes receive chain 105A and transmit chain 105B. The second transceiver includes receive chain 106A and transmit chain 106B. When cellular telephone 100 is receiving, a high frequency RF signal is received onto one or both of the antennas. For an RF signal received onto antenna 101, the signal passes through duplexer 108, matching network 109, and through the receive chain 105A. The signal is amplified by Low Noise Amplifier (LNA) 110 and is down-converted in frequency by mixer 111. The resulting down-converted signal is filtered by baseband filter 112 and is passed to the digital baseband integrated circuit 104 via an appropriately controlled multiplexer 113. An Analog-to-Digital Converter (ADC) 114 in digital baseband integrated circuit 104 converts the signal into a stream of digital samples. The stream of samples is then processed by a receive channel 115 (see FIG. 4) within digital baseband integrated circuit 104.

If cellular telephone 100 is to be transmitting from antenna 101, then information to be communicated is processed by transmit channel 116 (see FIG. 4) of the digital baseband integrated circuit 104 and is converted into analog form by a Digital-to-Analog Converter (DAC) 117. The resulting analog signal is supplied via an appropriately controlled demultiplexer 118 to "transmit chain" 105B of RF transceiver integrated circuit 103. Baseband filter 119 filters out noise introduced by the digital-to-analog conversion process. Mixer block 120 then up-converts the signal into a high frequency signal. Driver amplifier 121 and an external power amplifier 122 amplify the high frequency signal to drive antenna 101 so that a high frequency RF signal is transmitted from antenna 101. In mobile communication device 100, one or both of the antennas can be used depending on the mode of operation.

Figure 4:
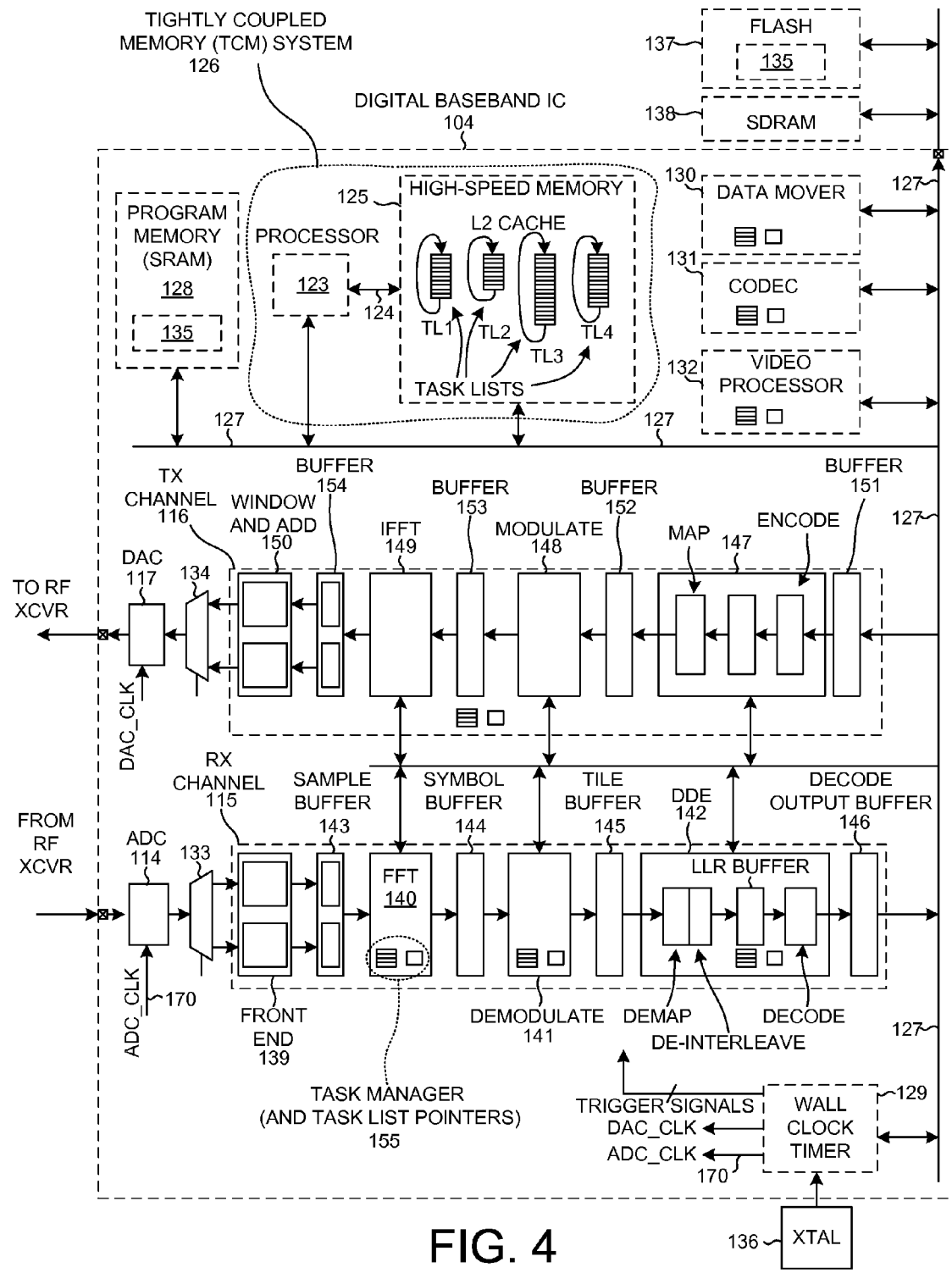
FIG. 4 is a more detailed diagram of the digital baseband integrated circuit 104 of the mobile communication device of FIG. 2.

FIG. 4 is a more detailed block diagram of the digital baseband integrated circuit 104 of FIG. 2. In addition to ADC 114, receive channel 115, transmit channel 116 and DAC 117, digital baseband integrated circuit 104 includes a processor 123, a first bus 124, and an amount of high-speed multi-banked dual port memory 125. Processor 123 can read from and write to memory 125 via first bus 124. Processor 123 is a multi-core processor or a multi-threaded processor and may actually involve multiple processors. First bus 124 is a high-speed, point-to-point, bus involving one master, the processor 123, and one slave, memory 125. Processor 123, first bus 124, and memory 125 together form what is referred to as a Tightly Coupled Memory (TCM) system 126. Memory 125 is not program memory, but rather is high speed, level-two cache, multi-ported and multi-banked, memory used for storage of variables and data and control information.

In addition, digital baseband integrated circuit 104 includes a second bus 127, an amount of program memory 128, a wall clock timer 129, a data mover block 130, a codec block 131, a video processor block 132, a set of one-to-two demultiplexers 133, and a set of two-to-one multiplexers 134. Program memory 128 stores a program of instructions 135 that is executed by processor 123. Wall clock timer 129 uses a reference clock signal supplied by an external crystal 136 to increment a counter. The counter outputs a continuously incrementing sequence of count values that is an indication of real time. The processor 123 and other circuits on second bus 127 can read from and write to the wall clock timer 129 across second bus 127 as explained in further detail below. Memory 125 is accessible by processor 123 across first bus 124 with a smaller memory access latency than memory 125 is accessible via second bus 127. The digital baseband integrated circuit 104 of FIG. 4 is also coupled via second bus 127 to an external FLASH non-volatile memory device 137 and to an external Synchronous Dynamic Random Access Memory (SDRAM) 138. The data mover block 130 and the processor 123 can read from and write to external devices 137 and 138 across second bus 127 as explained in further detail below.

Receive channel 115 (baseband receive hardware) includes a plurality of functional blocks 139-142, referred to here as Wireless Communication System Modem Sub-Circuits (WCSMSCs). WCSMSCs 139-142 include a front end sub-circuit 139, a Fast Fourier Transform (FFT) sub-circuit 140, a demodulate (DEMOD) sub-circuit 141, and a Demap/De-Interleave/Decode (DDE) sub-circuit 142. An amount of memory, referred to here as a "sample buffer" 143, buffers data passing from front end WCSMSC 139 to FFT WCSMSC 140. A similar amount of memory, referred to here as a "symbol buffer" 144, buffers data passing from FFT WCSMSC 140 to DEMOD WCSMSC 142. Another amount of memory, referred to here as a "tile buffer" 145, buffers data passing from DEMOD WCSMSC 141 to DDE WCSMSC 142. A "decode output buffer" 146 buffers data passing from DDE WCSMSC 142 to second bus 127. The general path of receive channel data is from left to right in FIG. 4 through circuits 114, 133, 139, 143, 140, 144, 141, 145, 142, and 146, to second bus 127.

Transmit channel 116 includes another plurality of Wireless Communication System Modem Sub-Circuits (WCSMSCs) 147-150. WCSMSCs 147-150 include an encode/interleave/map sub-circuit 147, a modulate sub-circuit 148, an Inverse Fast Fourier Transform (IFFT) sub-circuit 149, and a window and add sub-circuit 150. The various sub-circuits of the transmit channel are buffered by a set of buffers 151-154 as illustrated. The general path of transmit channel data is from right to left through circuits 151, 147, 152, 148, 153, 149, 154, 150, 134, and 117, to RF transceiver integrated circuit 103.

In one novel aspect, memory 125 of Tightly Coupled Memory system 126 stores a plurality of task lists as illustrated. Each task list contains a sequence of task instructions for execution by an associated sub-circuit of the digital baseband integrated circuit 104. In the illustrated example, task list TL1 contains task instructions for FFT WCSMSC 140. Task list TL2 contains task instructions for DEMOD WCSMSC 141. Task list TL3 contains task instructions for DDE WCSMSC 142. Task list TL4 contains task instructions for data mover block 130. Although not illustrated in FIG. 4, memory 125 also contains a task list for the transmit channel circuitry 116 as a whole, for codec block 131, and for video processor block 132. Processor 123 can write task instructions into these task lists, modify these task list, delete task lists, and otherwise maintain the task lists as desired via first bus 124. Each task list is maintained in memory 125 in a circular buffer. Each task list contains task instructions that, when executed by the appropriate sub-circuit, configure and control the sub-circuit. Each of the associated sub-circuits includes a task manager circuit that is coupled to second bus 127 as well as an amount of dedicated functional circuitry for performing a data processing operation. Reference numeral 155 in FIG. 4 identifies the task manager circuit 155 of FFT WCSMSC 140.

Figure 5:
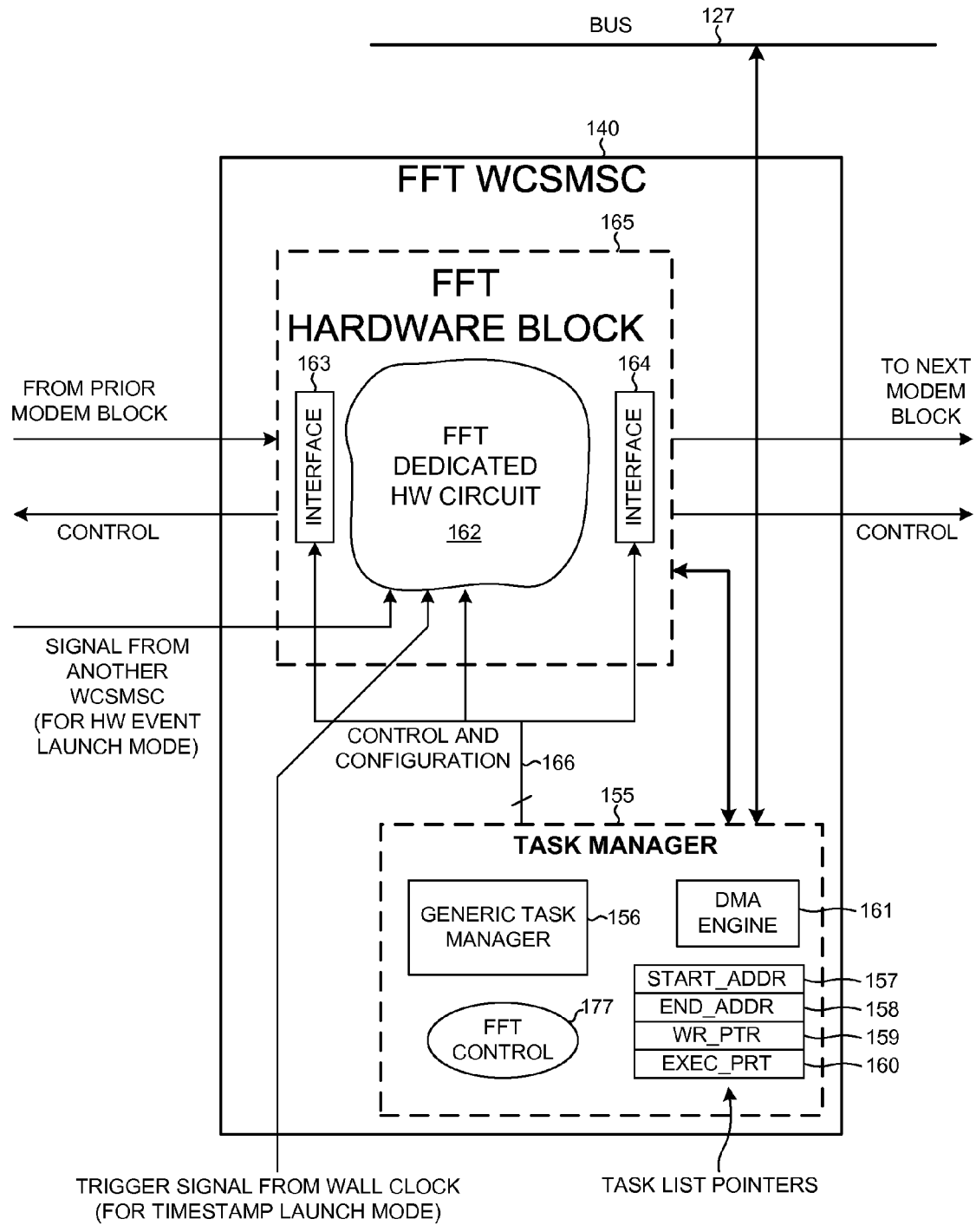
FIG. 5 is a diagram of an exemplary modem sub-circuit that involves a task manager functionality.

FIG. 5 is a more detailed diagram of one representative WCSMSC. The WCMSC pictured is the FFT WCSMSC 140. The task manager circuit 155 includes a generic task manager portion 156, an FFT control state machine portion 177, a set of pointer registers 157-160, and a DMA (Direct Memory Access) engine 161. FFT WCSMSC 140 includes an amount of dedicated hardware circuitry 162 for performing the main data processing operations of the WCSMSC. Dedicated hardware circuitry 162 can receive data from buffer 143 via a first interface circuit 163. Dedicated hardware circuitry 162 can supply data into buffer 144 via a second interface circuit 164. As explained in further detail below, the generic task manager portion 156 is adapted to read task instructions, one by one, from the corresponding task list (TL1) in memory 125 via second bus 127. Processor 123 can write a write pointer WR_PTR into register 159 of the task manager 155 across second bus 127. DMA engine 161 can read information from FFT hardware block 165 and write that information via second bus 127 into a circuit on second bus 127 such as, for example, memory 125. FFT control circuitry 177 interprets the task instructions read by the generic task manager portion 156, and then uses signal conductors 166 to control and configure FFT hardware block 165. In this way, the task manager 155 can control interface 163 such that data from a particular portion of sample buffer 143 (see FIG. 4) is read and transferred into FFT dedicated hardware circuitry 162 for processing. Similarly, task manager 155 can control interface 164 such that data output by FFT dedicated hardware circuitry 162 is written into a particular portion of symbol buffer 144 (see FIG. 4). Although the second bus 127 is pictured in FIG. 5 and in FIG. 4 as a single line for ease of illustration and explanation, the second bus 127 may include a first sub-bus that couples processor 123 to pointer registers in each of the task managers of the various WCSMSCs, and it may further include a second sub-bus that couples the task managers of the various WCSMSCs to memory 125. The generic task manager 156 is referred to as being "generic" because its hardware is replicated in the task manager of each of the WCSMSCs. The control circuit depicted in the oval in FIG. 5, on the other hand, is a state machine circuit specific to the task instructions of the particular WCSMSC to be controlled. The circuitry of the task manager is realized by describing the functions of its various component parts in a hardware description language such as Verilog or VHDL, and then using a commercially available synthesis tool to generate a hardware circuit design that performs the described functions.

Figure 6:
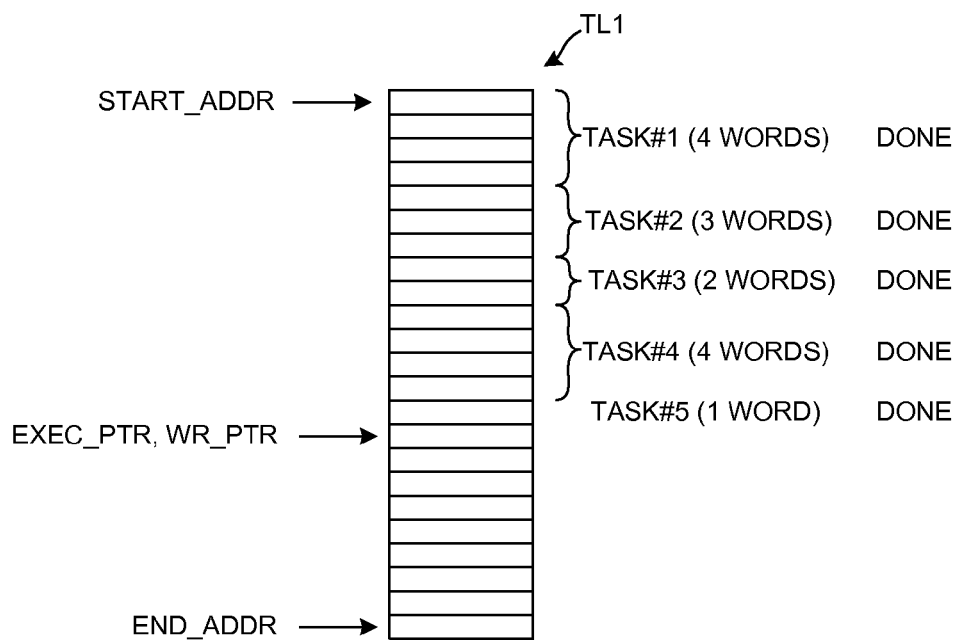
FIG. 6 is a diagram of a task list in which all task instructions in the task list have been completed.

FIG. 6 is a diagram that illustrates a task list. In the particular example illustrated, the task list is task list TL1 for FFT WCSMSC 140. Task list TL1 is stored in a circular buffer within memory 125. The circular buffer starts at a location in memory 125 identified by the pointer START_ADDR in register 157. The circular buffer ends at a location in memory 125 identified by the pointer END_ADDR in register 158. The task manager 155 of FFT WCSMSC 140 knows where the circular buffer storing task list TL1 starts and ends in memory 125 by virtue of the START_ADDR and END_ADDR pointers being stored in registers 157 and 158 in task manager 155. These registers are accessible to generic task manager 156. Each rectangle in FIG. 6 represents a word in memory 125. In the example of FIG. 6, there are several task instructions (TASK#1, TASK#2, TASK#3, TASK#4, TASK#5) in task list TL1. Notice that some task instructions include more words than others. The pointer EXEC_PTR identifies the next location (next word) after the end of the last task instruction that was executed by the WCSMSC. The pointer WR_PTR identifies the end of the last word of the last task instruction to be executed. In the example of FIG. 6, the FFT WCSMSC has executed all the task instructions in its task list TL1. The EXEC_PTR and WR_PTR pointers therefore point to the same location. If the pointers are in this condition, then task manager 155 does not attempt to read any more task instructions from task list TL1.

Figure 7:
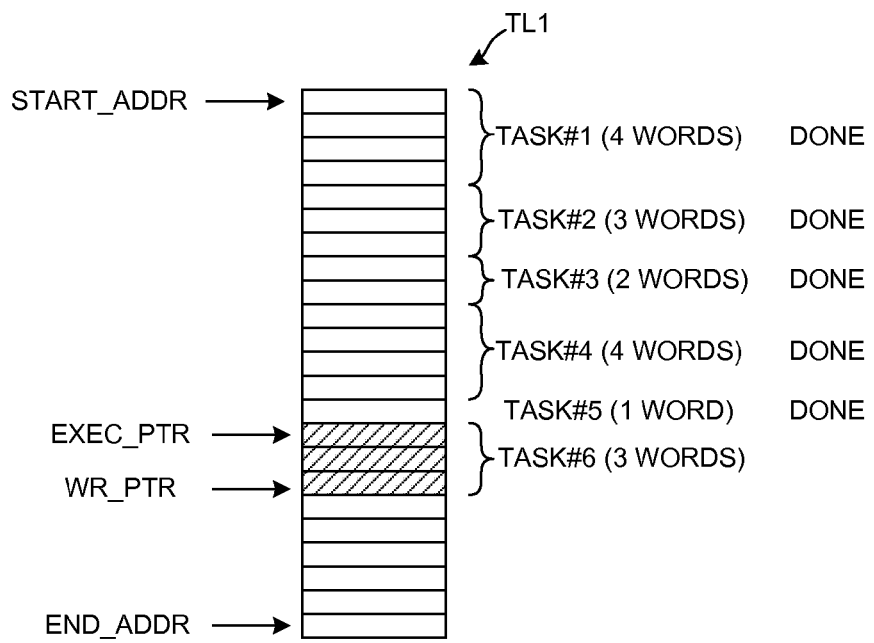
FIG. 7 is a diagram of a task list that includes an unexecuted task instruction.

FIG. 7 is a diagram that illustrates TL1 task list after processor 123 has written a new task instruction (TASK#6) into task list TL1. Processor 123 adds the task instruction TASK#6 to the TL1 task list in memory 125 and then increments the WR_PTR pointer in register 159 of task manager 155 by three by writing the new WR_PTR value across second bus 127 and into register 159. Task manager 155 detects the condition that WR_PTR has been updated, and responds by reading the next task instruction (TASK#6) out of memory 125 across second bus 127. After reading the task instruction, task manager 155 updates EXEC_PTR to point to the next location in the task list after the last task instruction that was read. By this mechanism, processor 123 causes a particular WCSMSC to perform particular tasks by writing appropriate task instructions into the task list for the WCSMSC across high-speed first bus 124. Once the task list in memory 125 has been updated, then processor 123 only need do one write across second bus 127 to update the WR_PTR of the WCSMSC such that the task manager of the appropriate WCSMSC responds, reads the next task instruction, interprets it, and causes the operations it designated to be performed.

Figure 8:
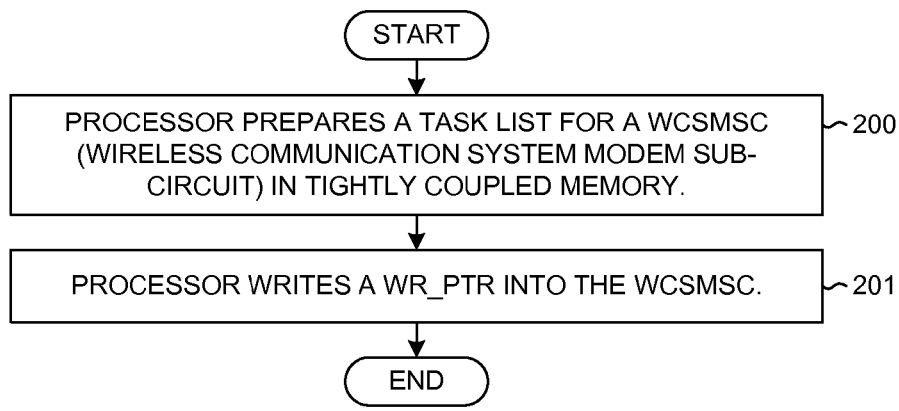
FIG. 8 is a simplified flowchart that illustrates steps taken by a processor to prepare and maintain a task list.

FIG. 8 is a simplified flowchart that illustrates how processor 123 can cause a desired WCSMSC to perform a desired operation. In a first step (step 200), processor 123 prepares a task list for the WCSMSC in memory 125 that includes a task instruction that instructs the WCSMSC to perform the desired operation. Processor 123 may, for example, write the task instruction onto the end of the task list for the target WCSMSC in memory 125 via high-speed first bus 124 as described above. In a second step (step 201), processor 123 updates the value of WR_PTR in the task manager of the target WCSMSC across slower bus 127 so that the task manager's WR_PTR points to a task list location after the ending location of the newly added task instruction. Only one write across the slow bus 127 is required to initiate execution of task instructions in the task list.

Figure 9:
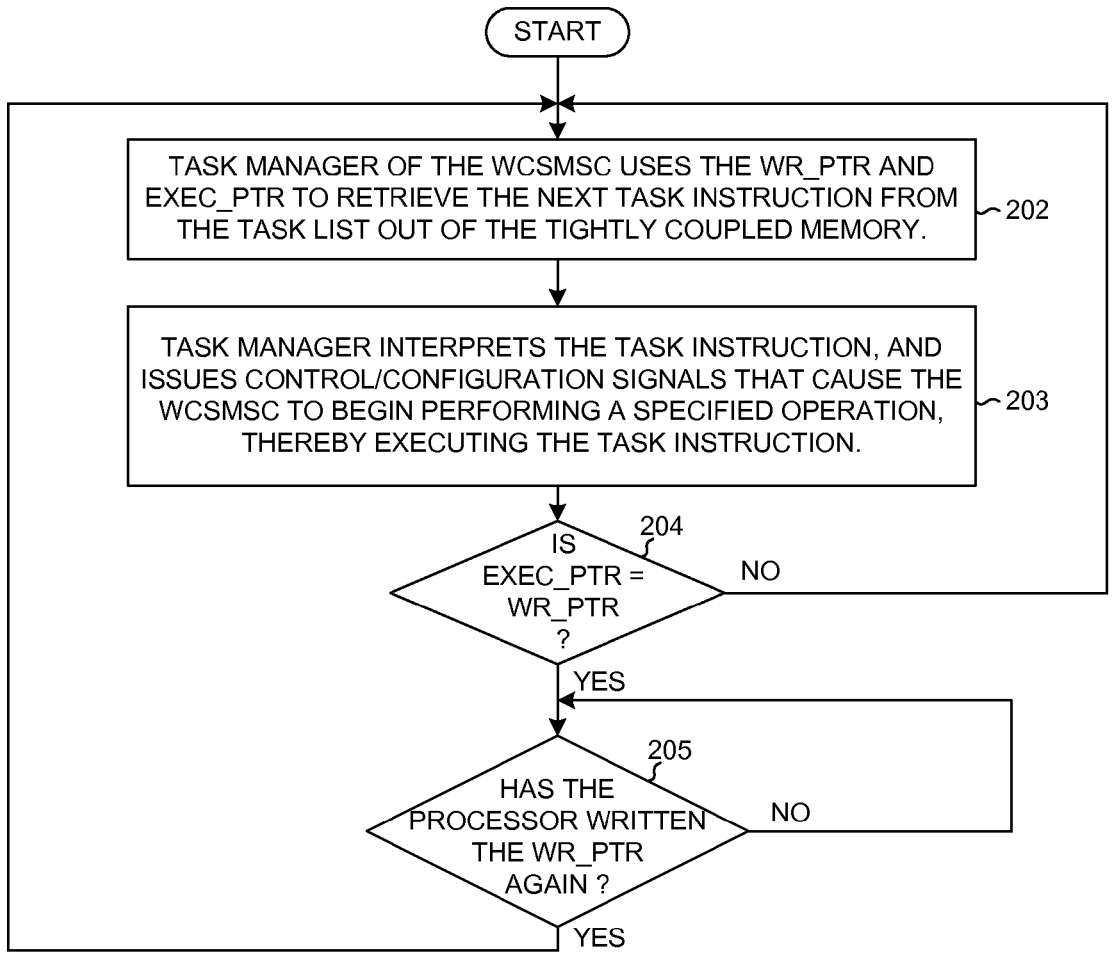
FIG. 9 is a simplified flowchart that illustrates steps taken by a task manager to read and initiate execution of the operation of a task instruction.

FIG. 9 is a simplified flowchart that illustrates how the task manager of the target WCSMSC responds to the processor operation of FIG. 8. In a first step (step 202), the task manager recognizes that its WR_PTR has been updated and in response reads the next task instruction out of its task list in memory 125. The task manager performs this read across second bus 127. The task manager then interprets (step 203) the task instruction and generates control and/or configuration signals (for example, via conductors 166 in FIG. 5) that are supplied to the hardware block portion of the WCSMSC. The control and/or configuration signals cause the hardware block portion to perform an operation specified by the task instruction. Performing this operation is referred to here as "executing" the task or executing the task instruction. In one example, the WCSMSC performs the specified operation without fetching any instruction other than task instructions from its task list. Next, if the EXEC_PRT is not equal to the WR_PTR (step 204), then there are more task instructions on the task list to be read and executed. Processing returns to step 202. If, however, the EXEC_PTR equals the WR_PTR (step 204), then there are no more task instructions on the task list to be performed. Only if the processor 123 writes the WR_PTR again indicating that there are more task instructions to be executed (step 205), does the task manager return to step 202 to reading a task instruction from memory 125. The task manager treats the locations between START_PTR and END_PTR in memory 125 as a circular buffer. Accordingly, if the last executed task instruction is at the end of the circular buffer then the task manager looks for a newly added task instruction at the start of the circular buffer. Buffer overflow and underflow error checks can be incorporated.

Some task instructions are a type of task instruction referred to here as "timestamp task instructions" or a "timed task instructions." A timestamp task instruction includes a field that contains a timestamp. This timestamp corresponds to a timer count value output by a wall clock counter within wall clock timer block 129 of FIG. 4. The task manager that reads such a timestamp task instruction interprets the task instruction, but does not cause the associated hardware of the target WCSMSC to begin performing the specified operation until the time indicated in the timestamp field of the task instruction has been reached. The processor 123 can therefore write timestamp task instructions into multiple different task lists and can update the WR_PTRs of the corresponding task managers such that the corresponding task managers read the timestamp task instructions. If all the timestamps of these timestamp task instructions are set at the same future time, then the task managers will not cause their respective hardware blocks to begin executing the specified operations. When the time count value as maintained by wall clock counter 129 of FIG. 4 reaches the timestamp value, then all the task managers will simultaneously initiate their respective hardware blocks in execution of their respective operations as previously set up by the processor. In this way processor 123 can control multiple WCSMSCs to perform operations simultaneously, despite the fact that processor 123 executes instructions sequentially.

Figure 10:
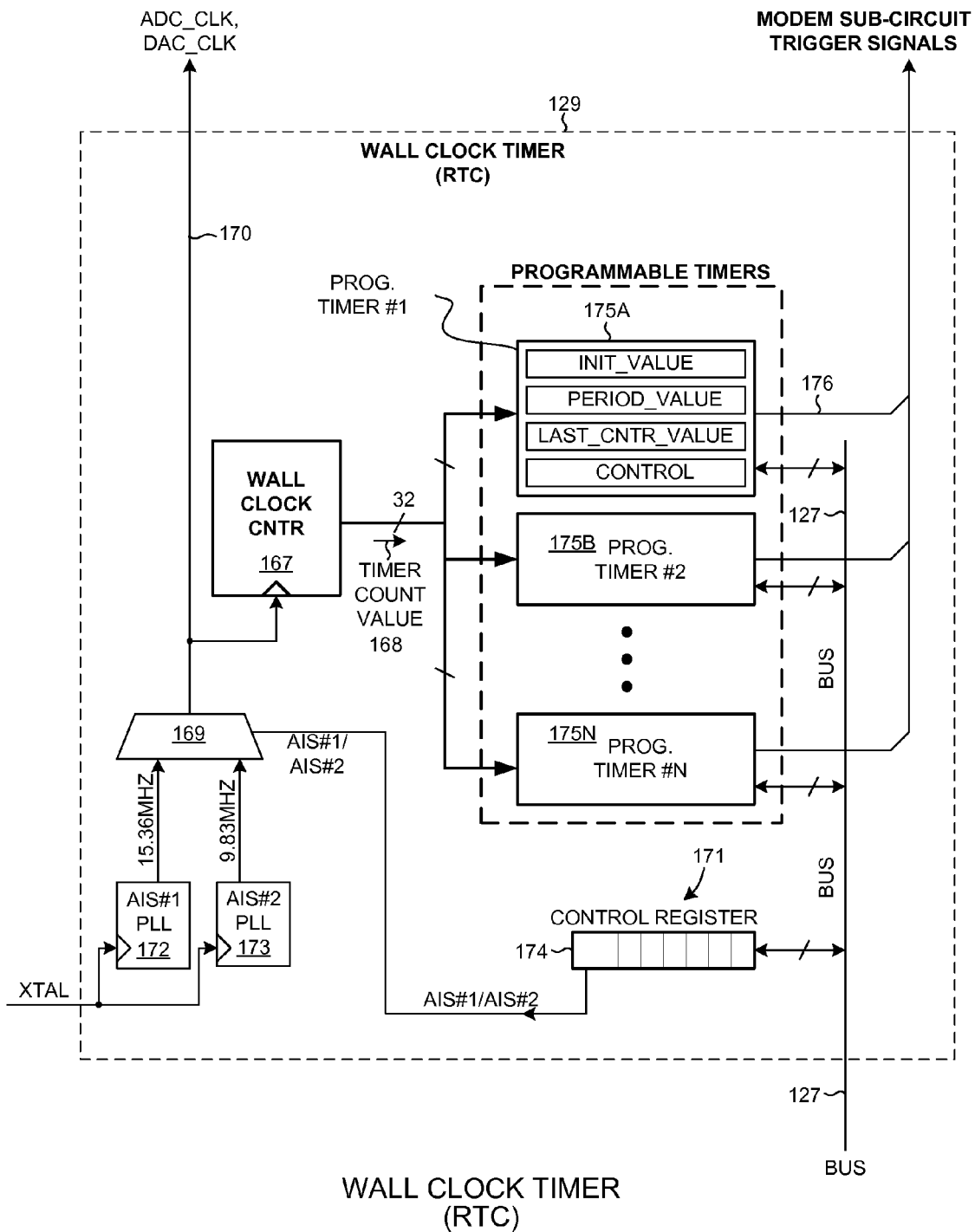
FIG. 10 is a simplified block diagram of the wall clock timer 129 of the digital baseband integrated circuit 104 of FIG. 4.

FIG. 10 is a block diagram of wall clock timer 129 of FIG. 4. Wall clock timer 129 includes a 32-bit wall clock counter 167 that includes so many bits that its count does not roll over throughout the entire operational life (for example, ten years) of the modem of which wall clock timer 129 is a part. The timer count value 168 therefore corresponds to and indicates real time. This indication of real time is usable by all the various sub-circuits of the modem (through the use of timestamp task instructions) and as such is referred to a "wall clock time". In this example, wall clock counter 167 increments once for each sample passing into the receive channel 115 of FIG. 4. The clock signal that clocks wall clock counter 167 is the same signal ADC_CLK that is supplied via line 170 to ADC 114 of FIG. 4. Wall clock counter 129 includes a control register 171 that can be written to via second bus 127. Wall clock timer 129 includes two phase-locked loops (PLLs) 172 and 173 that generate clock signals of the correct sampling frequency for two different air interface standards. In the illustrated example, PLL 172 outputs a clock signal of the correct 15.36 MHz required for a LTE (Long Term Evolution) air interface standard, whereas PLL 173 outputs a clock signal of the correct 9.83 MHz required for an UMB (Ultra Mobile Broadband) air interface standard. Processor 123 sets the correct sampling frequency for the communications to be processed by the modem by writing an appropriate control bit into bit 174 of control register 171. LTE is a technology known in the art and is described in documents available from an organization named "3rd Generation Partnership Project" (3GPP). UMB is a technology known in the art and is described in documents from an organization named "3rd Generation Partnership Project 2" (3GPP2).

Wall clock timer 129 also includes a plurality of programmable timer blocks 175A, 175B through 175N. Each of these programmable timer blocks includes a comparator that can be controlled to compare an INIT_VALUE to the timer count value 168 as output by wall clock counter 167. As explained above, the task managers of the various WCSMSCs are coupled to second bus 127. Due to the interface of second bus 127 to the programmable timer blocks 175A, 175B through 175N, a task manager of a WCSMSC can write an INIT_VALUE and a CONTROL value into a programmable timer by writing to an appropriate address across second bus 127. If the programmable timer is configured by these INIT_VALUE and CONTROL values correctly, when the timer count value 168 output by the wall clock counter 167 reaches the INIT_VALUE the comparator in the programmable timer block will assert a trigger signal. Line 176 in FIG. 7, for example, identifies a signal conductor that carries the one-bit digital trigger signal generated by the first programmable timer block 175A. This trigger signal is coupled by an appropriate hardwired connection to an appropriate input of the dedicated hardware circuit in a particular WCSMSC such that if the trigger signal is asserted, then the dedicated hardware circuit will begin performing an operation for which it is configured. In one specific example of using a timestamp task instruction, the trigger signal conductor 176 is hardwired to the dedicated hardware circuit that is to be started at a particular time. The task manager for the WCSMSC reads its task list and obtains the timestamp task instruction. As a result of interpreting the timestamp task instruction, the task manger writes to the wall clock timer block 129 across second bus 127 and sets up the programmable timer whose trigger signal output lead is connected to the dedicated hardware circuitry start input lead. The task manager writes the timestamp value obtained from the timestamp task instruction into the INIT_VALUE register of the programmable timer. The dedicated hardware circuit in the WCSMSC does not at this time begin performing the operation specified by the task instruction because the trigger signal has not yet been asserted. When the designated time arrives, a comparator in the programmable timer detects that the timer count value 168 as output by the wall clock counter 167 matches the INIT_VALUE. As a result of this detecting, the comparator asserts the trigger signal, thereby starting the hardware circuit in the WCSMSC.

Figure 11:
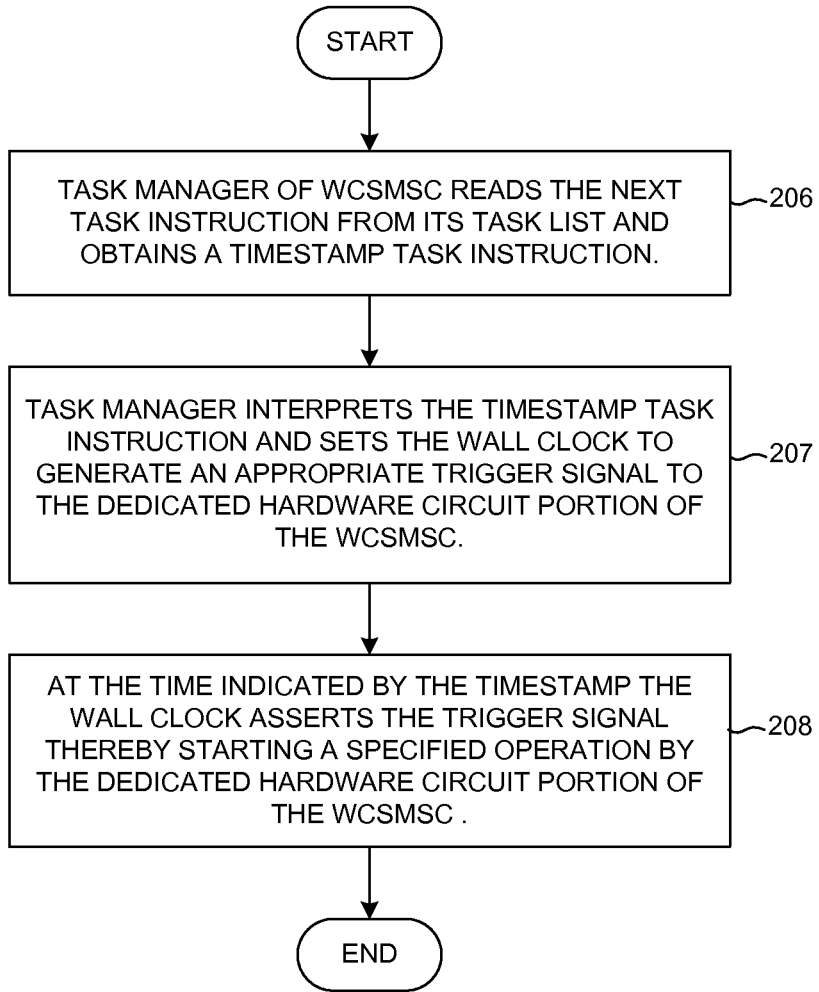
FIG. 11 is a simplified flowchart that illustrates steps taken by a task manager in reading and initiating the execution of a timestamp task instruction.

FIG. 11 is a simplified flowchart that illustrates use of a timestamp task instruction. In a first step (step 206), the task manager reads the next task instruction from memory 125 across second bus 127. The task manager then interprets (step 207) the timestamp task instruction. As a result of the interpreting of the task instruction, the control circuit portion of the task manager sets up the wall clock timer block 129 to assert the trigger signal that is supplied to the dedicated hardware circuit portion of the WCSMSC. As set forth above, in one example, the task manager writes values across second bus 127 into wall clock timer 129 so set up the appropriate programmable timer. Then, at a later time indicated by the timestamp, the wall clock timers asserts (step 208) the trigger signal. The asserting of the trigger signal starts the dedicated hardware circuit of the WCSMSC in performing a specified operation. The operation(s) performed may, for example, be determined by value(s) in other fields of the timestamp task instructions.

There are many ways of implementing circuitry for executing a timestamp task instructions. The example set forth above in which the task manager of the target WCSMSC sets up a programmable timer in the wall clock to generate a trigger signal is but one possible way. In another example, the comparator that compares the timestamp value to wall clock time is located in the task manager, and the timer count value 168 (wall clock time) is supplied to the comparator.

In addition to initiating execution of a task instruction at a time indicated by a timestamp, there are three other ways that execution of a task instruction can be launched. The four different ways of designating how a task instruction should be executed are referred to as "launch modes". In addition to the timestamp launch mode described above, there is an immediate launch mode. In the immediate launch mode, the operation associated with the task instruction is started as soon as the task manager interprets the task instruction. The operation specified by the task instruction is then initiated without any qualification. There is also a launch mode referred to as the "HW event driven" launch mode. In this mode, the operation to be performed starts at the time a particular hardware event occurs. An example of a hardware event that can be made to launch execution of a HW event driven task instruction is completion of a hardware task or an indication of resource availability. There is also a fourth launch mode referred to as the "SW event driven" launch mode. In this mode, the operation to be performed starts when software writes to an identified register. Which particular launch mode is being employed is designated by a two bit field in the first word of the task instruction. Processor 123 can specify how the task will be executed by setting these two bits in the task instruction to appropriate values.

FIG. 12A is a diagram of the first 64-bit of a task instruction. These bits are also called a "common header". The first four bits "OP" are an opcode. The generic task manager portion of the task manager decodes this opcode to determine the type of task instruction and how to handle the various fields of the task instruction. The next eight "LN" bits are a length field that holds a number. This number indicates the number of words in the task instruction. The generic task manager portion of the task manager uses this length field to determine how many words to read from memory 125. The "AT2" field contains a code that indicates which one of the four launch modes is to be used. The "RTC COUNT" field is a timestamp.

FIG. 12B is a diagram of a task instruction called the "FFT Task". The common header of the FFT task is as shown in FIG. 12A. The next sixty-four bits include various fields including a source address field, a destination address field, and a four-bit FFT size field. The four-bit FFT size field contains a number of locations in a buffer. For each buffer value read into the FFT WCSMSC, the FFT WCSMSC outputs one value. The source address field contains an address of the first location in sample buffer 143 from which the FFT WCSMSC reads data to process. The destination field contains an address of the first location in symbol buffer 144 where FFT WCSMSC places processed data. The number of consecutive buffer locations to be read from sample buffer 143, and the corresponding number of consecutive buffer locations to be written into symbol buffer 144, is set forth in the FFT size field.

FIG. 12C is a diagram of a task instruction called "Sample Buffer Push Task". The source address field indicates the starting address in sample buffer 143 from which data should be pushed. The destination address field indicates the starting address in memory 125 where the pushed data should be written. The sample buffer push length field contains a number that indicates the number of consecutive buffer locations to push.

FIG. 12D is a diagram of a task instruction called "FFT Sample Buffer Push Task". Execution of this task instruction causes the FFT WCSMSC to perform an FFT operation as specified by the second sixty-four bits of the task instruction, and in addition execution of this task instruction causes data to be pushed from the sample buffer 143 to memory 125.

Figure 12E:
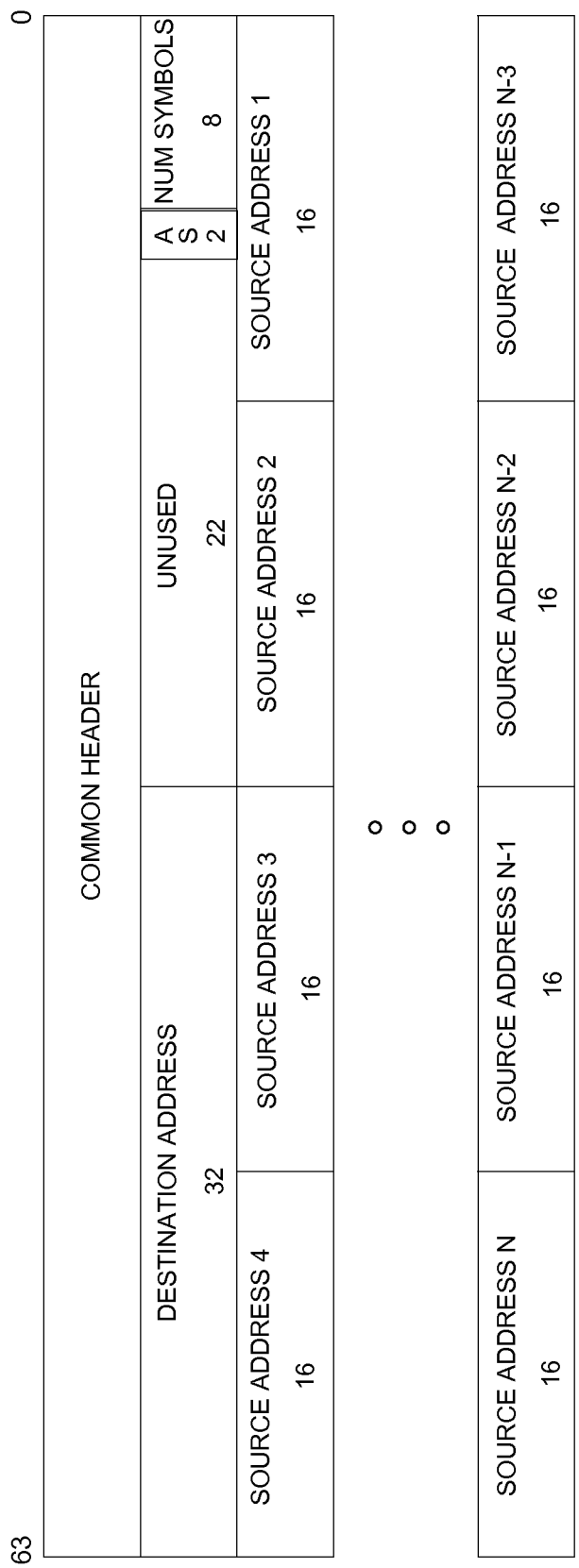
FIG. 12E is a diagram of the Symbol Buffer Push Task instruction.

FIG. 12E is a diagram of another push task instruction called "Symbol Buffer Push Task". Execution of this task instruction causes multiple individually specified buffer locations to be pushed by FFT WCSMSC 140 from symbol buffer 144 into memory 125. The common header of this task instruction is as set forth in FIG. 12A. The values pushed are to be written into memory 125 at consecutive locations starting at the address indicated by the destination address field. The locations of the individual values to be pushed are indicated by the sequence of source address fields. The number of words of the task instruction, and therefore the number of values to be pushed, is set forth in the "Num Symbols" field.

FIG. 12F is a diagram of a task instruction called "Demod Config Task". FIG. 12G is a diagram of a task instruction called "Demod MMSE Task". FIG. 12H is a diagram of a task instruction called "Demod MRC Task". In general, the Demod Config Task contains configuration parameters for DEMOD WCSMSC 141 that are relatively static, as compared to parameters set forth in the Demod MMSE and Demod MRC task instructions that are generally changed more frequently. In usage, a single Demod Config Task is used to configure the DEMOD WCSMSC 141, and then a sequence of either Demod MMSE Task instructions or Demod MRC Task instructions follow to cause the DEMOD WCSMSC to perform individual demodulation operations. There are two general types of demodulation operations that can be performed, a Minimum Mean Square Error (MMSE) type demodulation or a Maximum Ratio Combing (MRC) type demodulation. Demod MMSE Task instructions are used to perform MMSE type demodulation, whereas Demod MRC Task instructions are used to perform MRC type demodulation.

Figure 12I:
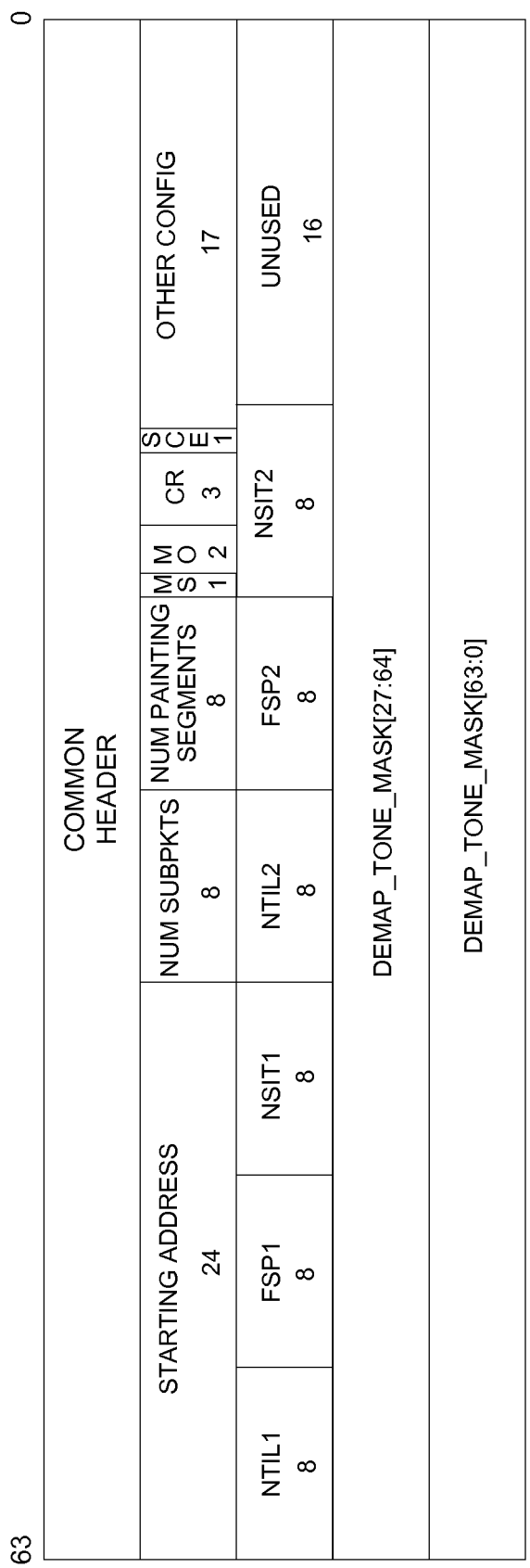
FIG. 12I is a diagram of the DDE Config Task instruction.

FIG. 12I is a diagram of a task instruction called "DDE Config Task". As in the case of the Demod Config Task described above, the DDE Config Task contains configuration parameters for the DDE WCSMSC 142 that are relatively static. One field of note is the one-bit "SCE" soft combine enable field. If this bit is set, then the decoder portion of DDE WCSMSC 142 is configured to perform soft combining of data from a prior transmission with data from the current transmission in accordance with a HARQ protocol.

FIG. 12J is a diagram of a task instruction called "DDE Clear LLR Task". Execution of this task causes data within a soft combining buffer (see the LLR buffer of FIG. 18) of DDE WCSMSC 142 to be cleared.

FIG. 12K is a diagram of a task instruction called "DDE Push Task". Execution of this task causes information to be pushed into memory 125. Information output by the Demap portion of the DDE WCSMSC 142 is pushed into locations in memory 125 as specified by the "Demap Push TCM Destination Address" field. Information output by the Decode portion of the DDE WCSMSC 142 is pushed into locations in memory 125 as specified by the "Decode Push TCM Destination Address". One of the many operations performed by the decoder portion of DDE WCSMSC 142 is to perform a cyclic redundancy check (CRC) to determine if the received data was successfully decoded. Whether the CRC check passed or failed is the status information. Setting the two-bit PSH field with the appropriate value causes the status information to be pushed into memory 125 with a known offset to the address in the "Decode Push TCM Destination Address" value.

The task instructions set forth in FIGS. 12A-12K are just examples of some of the task instructions used in the digital baseband integrated circuit 104 of FIG. 4. In a typical design employing the novel off-line task list methodology described here, as in the case of the digital baseband integrated circuit 104 of FIG. 4, there are many task instructions defined for to be executed by each of the WCSMSCs that has a task manager. Other task instructions include: DPICH XFER Task, CPICH XFER Task, Data Mover Task, Scatter Gather Task, Voice Output Push Task, VDEC Output Push Task, TDEC Output Push Task, ACK/NACK Detection Push Data Task, TX Frame Status Push Data Task.

Figure 13:
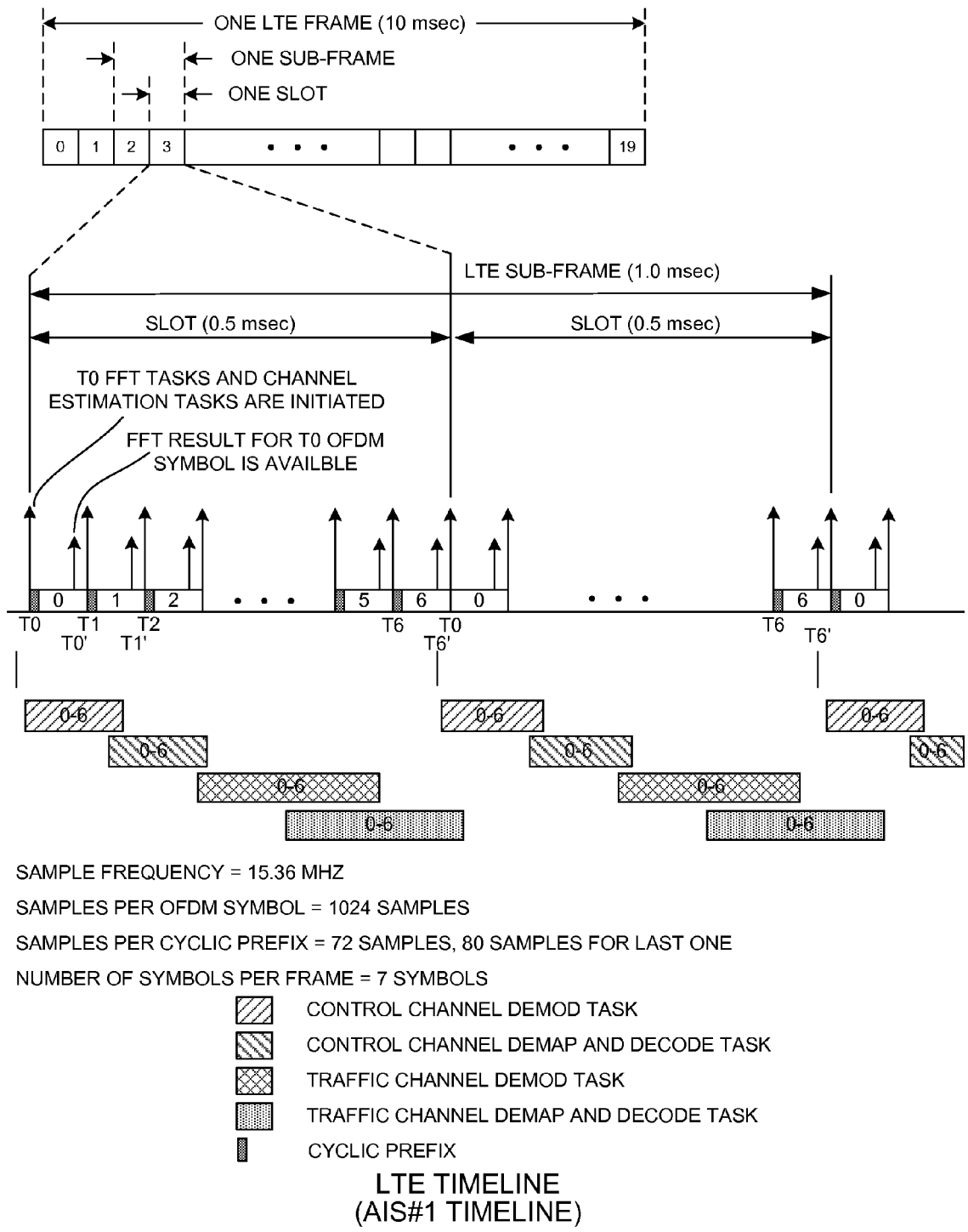
FIG. 13 is a timeline diagram that shows when various types of processing occur during the processing an incoming LTE frame.
Figure 14:
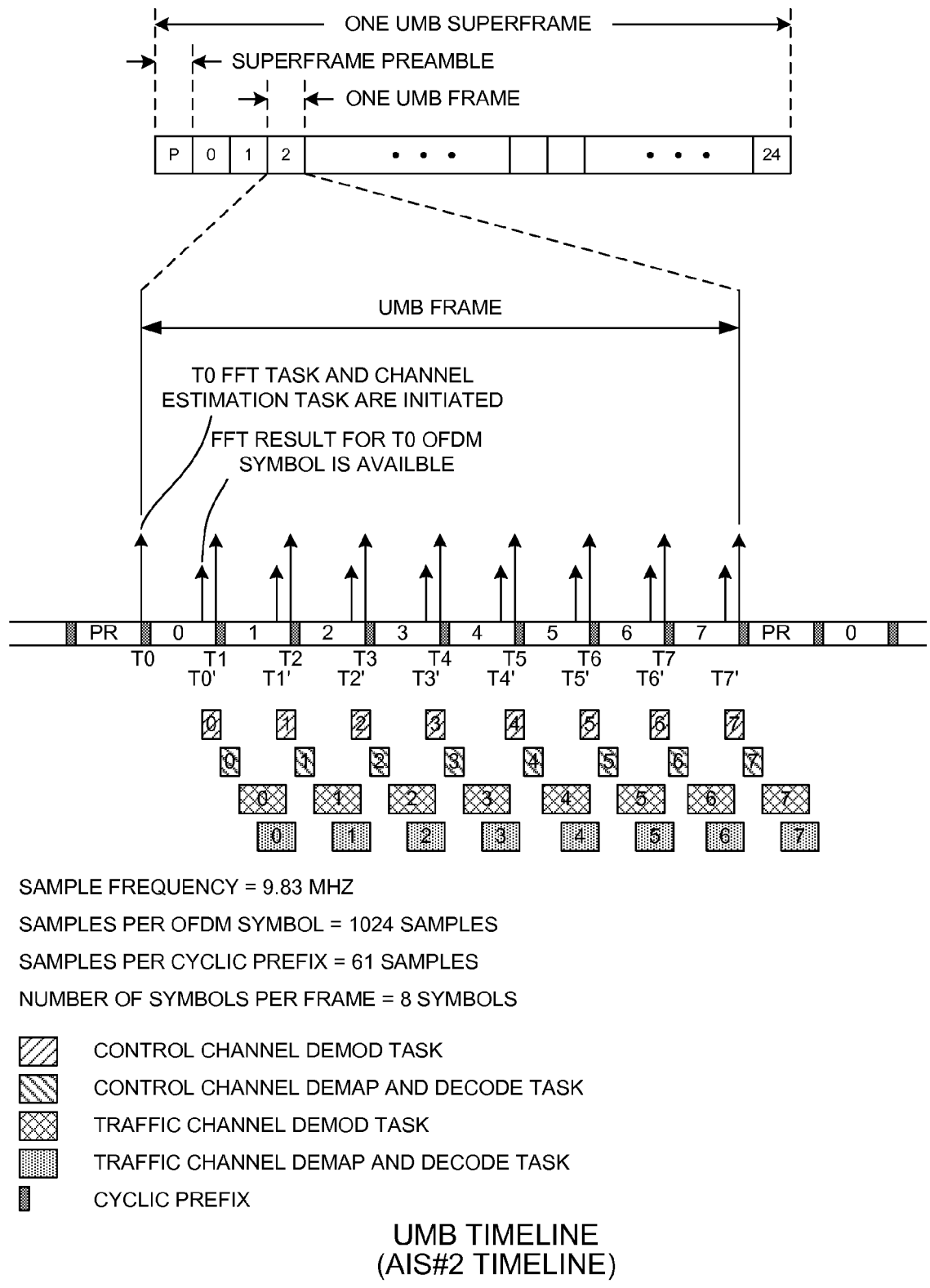
FIG. 14 is a timeline diagram that shows when various types of processing occur during the processing an incoming UMB frame.

FIG. 13 is a timeline diagram that illustrates when various types of processing occur during an example of receive channel processing an incoming LTE frame. FIG. 14 is a timeline diagram that illustrates when various types of processing occur during an example of receive channel processing of an incoming UMB frame. Note that in the LTE example, the results of seven OFDM symbol FFT operations are collected before the results are processed in a demodulation operation. In FIG. 13, the arrows designated T0'-T6' indicate when the results of seven FFT processing tasks. The arrows T0-T6 in FIG. 13 designate when these seven FFT processing tasks are started. Control channel demodulation is performed starting at a time shortly after the FFT processing results T6' are generated. After demodulation and decoding of control channel information, the traffic channel data of the seven symbols is demodulated and decoded starting and ending at times as illustrated in FIG. 13. In the UMB example of FIG. 14, in symbol rate hopping mode, in contrast, demodulation tasks and decode tasks are performed for each OFDM symbol. The number of samples per cyclic prefix is different than in the LTE example of FIG. 13. There are many different format and timing differences between the types of processing required to receive an LTE transmission and the types of processing required to receive a UMB transmission. Nonetheless, the types of operations have many similarities. In the receive processing of both types of transmissions, the following operations are performed: FFT processing, demodulation, and demaping/de-interleaving/decoding. Accordingly, in one novel aspect, the WCSMSCs of a receive channel of wireless modem are configured and controlled by off-line task lists such that the same hardware is usable to communicate transmissions in either one of the two air interface standards (LTE or UMB). In one example, program 135 executed by processor 123 (see FIG. 4) is initially, prior to power up of integrated circuit 104, stored in external FLASH memory 137. Upon power up, the program is read into integrated circuit 104 across second bus 127 and is loaded into program memory 128. Processor 123 executes the program 135 out of program memory. Program 135 dictates how processor 123 fashions and controls the task lists in memory 125, and therefore determines how the various sub-circuits of integrated circuit 104 are configured, and how their operations are launched, and how these sub-circuits operate together to receive and transmit wireless communications. In one mode the processor 123 under the direction of program 135 fashions and controls the task lists such that the various sub-circuits of integrated circuit 104 work together to communicate in accordance with the first air interface standard (for example, LTE), and in a second mode the processor 123 under the direction of program 135 fashions and controls the task lists such that the various sub-circuits of integrated circuit 104 work together to communicate in accordance with the second air interface standard (for example, UMB). Changing from one mode to another mode does not involve the redesign of any hardware due to the appropriate reconfigurability of the WCSMSC sub-circuits. The programming of the digital baseband integrated circuit 104 to accommodate changing standards is facilitated by the flexible and easy-to-understand task instructions, and the off-line task list architecture employed.

In one aspect of the task list architecture, if processing realized in hardware form in a particular WCSMSC of the modem becomes incompatible with a communication standard due to changes in the standard, and if the WCSMSC hardware was not designed to accommodate the new requirements of the changed standard, then the very same digital baseband integrated circuit 104 can nevertheless generally be relatively easily modified to operate in accordance with the changed standard. Rather than having the WCSMSC perform the operation whose requirements have changed, a push task instruction is employed to push data that the WCSMSC would have otherwise used to perform the operation. Processor 123 accesses the pushed data from memory 125, and performs the new type of processing required by the changed standard in software, and then controls subsequent WCSMSCs in the data path based on the results of the software processing. Processor 123 controls the subsequent WCSMSCs by modifying the task lists of the respective WCSMSCs as appropriate. A selected dedicated hardware sub-circuit can therefore be effectively removed from the receive or transmit channel, and the functions of the effectively removed sub-circuit can often then be replaced with a software implementation as desired.

Figure 15:
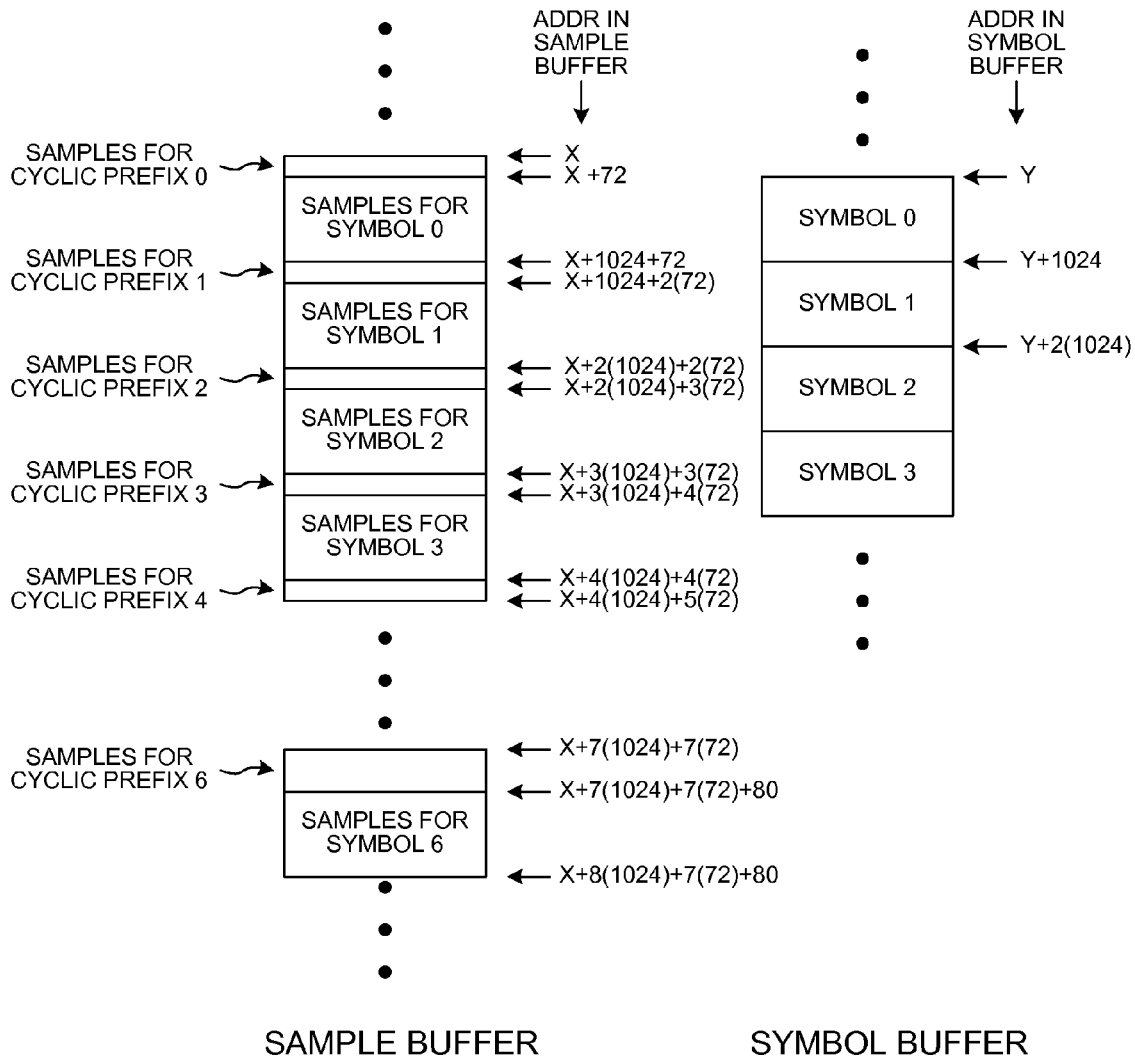
FIG. 15 is a diagram that illustrates operation of the FFT WCSMSC during the processing of an LTE frame.

FIG. 15 illustrates operation of FFT WCSMSC 140 in an example in which one slot of an incoming LTE frame is processed. Processor 123 initially configures wall clock timer 129 such that the ADC_CLK signal is of the correct sampling frequency (15.36 MHz in this case) for the LTE standard involved. The incoming stream of ADC samples is written into sample buffer 143 such that samples are written into successive buffer locations. As indicated in FIG. 13, in the LTE example an OFDM symbol involves 1024 samples. The prefixes that precede the symbols are of a length of seventy-two samples, except for the last prefix which has a length of eighty samples. The stream of incoming samples as they appear in sample buffer 143 is depicted in FIG. 15 in the column labeled "SAMPLE BUFFER". The addresses in the sample buffer 143 corresponding to the various symbols and prefixes are set forth in the next column to the right. The result of the FFT operation to be performed by FFT WCSMSC 140 involves placing an output value into symbol buffer 144 for each sample value read from sample buffer 143. Accordingly, the column in FIG. 15 labeled "SYMBOL BUFFER" shows a sequence of symbols. The prefix sample values from the sample buffer are not used and are ignored in the FFT operation. The prefix values are not to be passed on down the receive channel past the FFT WCSMSC 140. Accordingly, the 1024 location symbols of the "SYMBOL BUFFER" column of FIG. 15 are shown abutting each other without any intervening prefixes.

Figure 16:
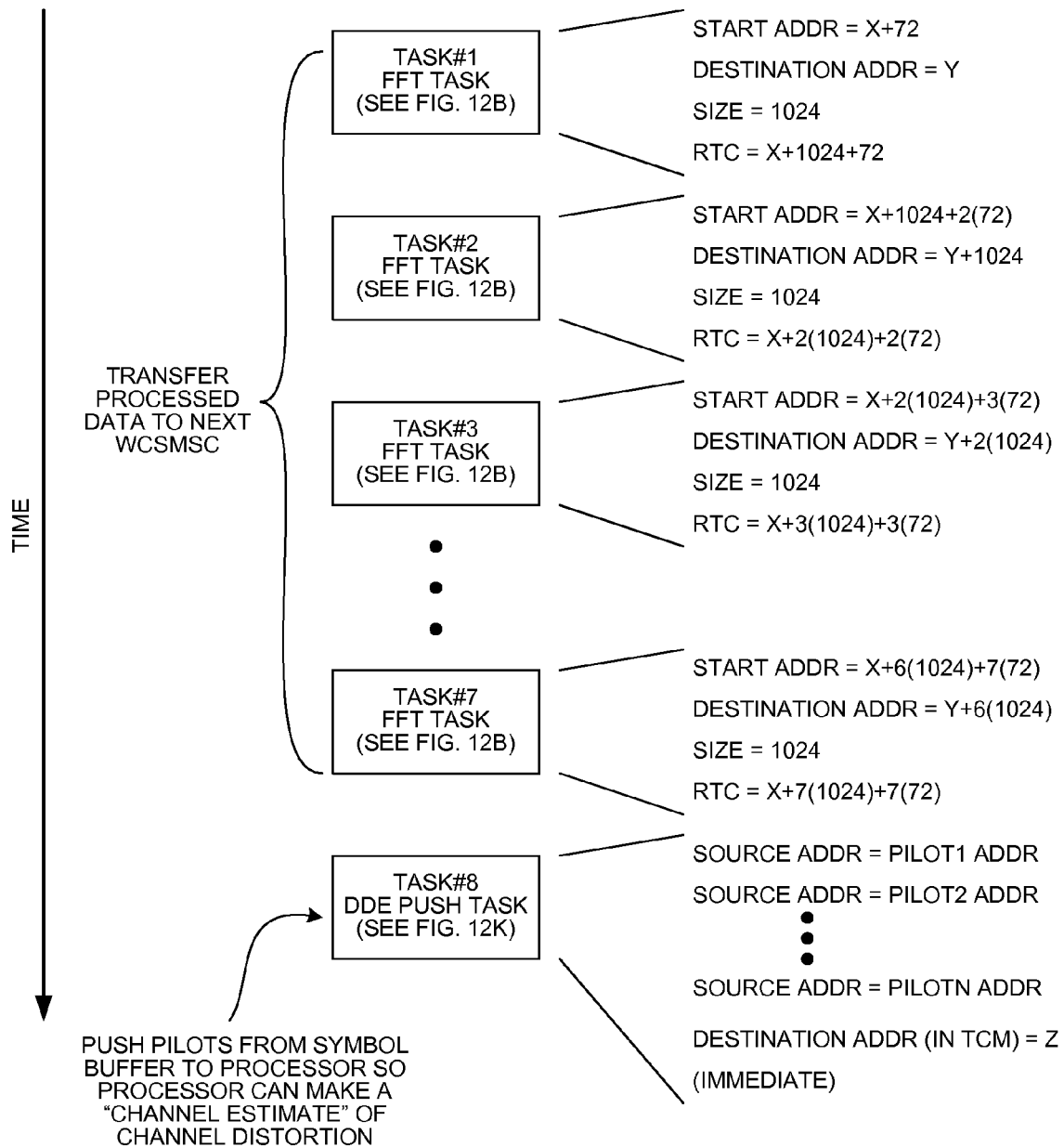
FIG. 16 is a diagram that illustrates how a task list can be created to perform the operations illustrated in FIG. 15.

FIG. 16 illustrates how a task list for the FFT WCSMSC 140 can be created to perform the LTE FFT processing outlined in FIGS. 13 and 15. The first task (TASK#1) in the task list is to read samples from sample buffer 143 starting at address X+72 as illustrated in FIG. 15. It is to write results into symbol buffer 144 starting at address Y as illustrated in FIG. 15. The number of samples read and symbol values written is 1024. The FFT operation can only be initiated after all the samples have been read into the FFT WCSMSC 140. The time the FFT operation itself should be started therefore is the time that timer count value 168 reaches the value X+1024+72. The upper four entries in the rightmost column of FIG. 16 indicate the values that should be set forth in the associated fields in the "FFT Task". FIG. 12B above sets forth the format of the FFT Task. The next six tasks added to the FFT task list are created in similar fashion. The starting addresses in the sample buffer 143 are specified such that in the reading of samples out of the sample buffer skip over prefix sample values. After seven FFT operations have been performed, one for every symbol, the demodulation operations can begin at time T7' illustrated in FIG. 13.

In the illustrated example, however, a special type of channel estimation operation must first be done by processor 123. The channel estimation operation is described here as an example of a operation that does not lend itself to being performed in a dedicated hardware circuit, but rather is more advantageously performed in more flexible software by processor 123. Certain pilot signal samples are spread around the locations within the symbol buffer in a pattern specified by the LTE standard. Accordingly, TASK#8 in FIG. 16 is the symbol buffer push task set forth in FIG. 12E. The source address fields in the "Symbol Buffer Push Task" instruction are the locations in symbol buffer 144 where these pilots are found. The launch mode is specified to be the immediate mode. After execution of the push task instruction by FFT WCSMSC 140, the processor 123 uses the pilot information in memory 125 to perform the special channel estimation operation in software. Demodulation parameters (for example, channel estimation parameters and interference estimation parameters) used in the demodulation performed by DEMOD WCSMSC 141 are dependent upon the result of the channel estimation. In the present example, processor 123 changes these demodulation parameters by providing these parameters in the various REAL and IMAG parameter fields of the demodulation task instructions that are written into the task list for DEMOD WCSMSC 141. If, for example, MMSE-type demodulation is to be used, then the parameters are provided in the Demod MMSE Task instruction (see FIG. 12G) that launches the demodulation operation illustrated starting shortly following time T7' in FIG. 13.

Another example of an operation performed by processor 123 in software, the results of which are then used in a task instruction to control subsequent processing, is the example of ACK/NACK processing. A DDE Push Task (see FIG. 12K) is put into the task list for DDE WCSMSC 142. The two-bit PSH field in this task instruction is set to cause the task manager of the DDE WCSMSC 142 to push the results of the CRC check into memory 125. In this example, processor 123 retrieves the pushed CRC check information, and uses that information to determine whether decoding succeeded or whether decoding failed. If decoding succeeded, then the received traffic data is not to be used in HARQ soft combining. Processor 123 therefore may write a DDE Clear LLR Task (see FIG. 12J) into the task list for the DDE WCSMSC 142 such that the soft combining buffer in the decode portion of the DDE WCSMSC 142 is cleared. A DDE Config Task instruction (see FIG. 21I) having its soft combining enable (SCE) bit set to zero may also be written into the task list to disable soft combining by the DDE WCSMSC 142. Processor 123 may also cause an ACK message to be transmitted by writing an appropriate task instruction into a task list for the transmit channel 116. If, on the other hand, processor 123 determines that decoding failed, then processor 123 will not clear the DDE soft buffer and will not disable soft combining such that information from a subsequent transmission will be soft combined with buffered information from the last failed transmission. Processor 123 may also cause a NACK message to be transmitted by writing an appropriate task instruction into the task list for transmit channel 116.

Figure 17:
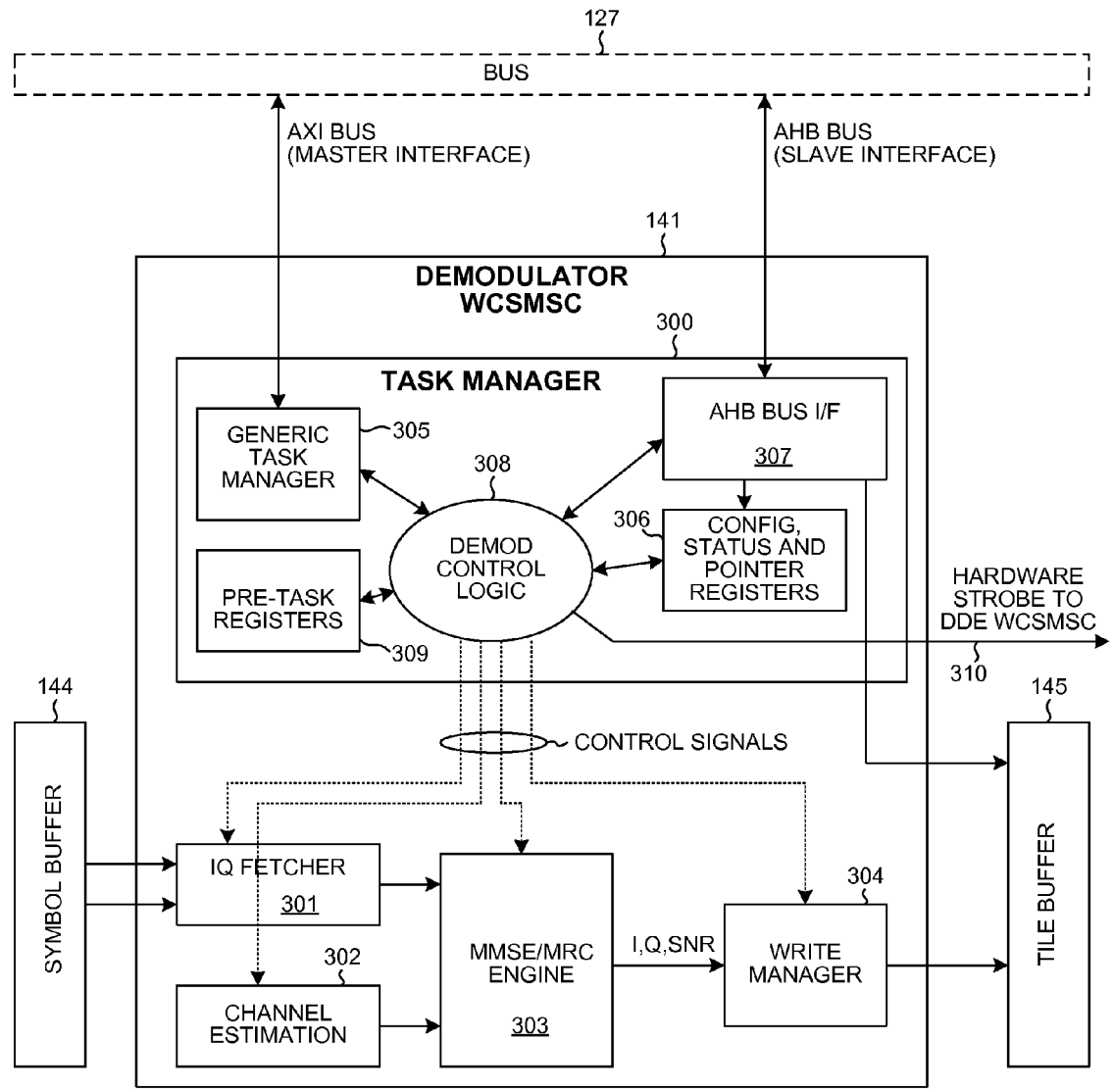
FIG. 17 is a block diagram of the DEMOD WCSMSC 141 of the digital baseband integrated circuit 104 of FIG. 4.

FIG. 17 is a block diagram of DEMOD WCSMSC 141 of FIG. 4. DEMOD WCSMSC 141 includes a task manager circuit 300, an IQ fetcher 301, a channel estimation circuit 302, a MMSE/MRC demodulator engine 303, and a write manager 304. Task manager circuit 300 includes a generic task manager portion 305, a set of registers 306 including pointer registers, an AHB bus interface 307, a demodulator control state machine portion 308, and a set of pre-task registers 309. Generic task manager portion 305 interfaces to an AXI bus portion of second bus 127 as a master. AHB bus interface 307 interfaces to an AHB bus portion of second bus 127 as a slave. The general flow of data is through a pipelined data path from symbol buffer 144, through the DEMOD WCSMSC 141, and to tile buffer 145. The task manager 300 uses the AXI bus interface to read task instructions from tightly coupled memory 125. Processor 123 acts as a master on the AHB bus and uses the slave AHB interface 307 to read internal registers of the DEMOD WCSMSC, to write the WR_PTR register of the registers 306, and to read tile buffer 145 through DEMOD WCSMSC 141. DEMOD WCSMSC 141 can perform three general types of task instructions: a configuration task instruction which when executed loads configuration parameters for the WCSMSC hardware engines for a future demodulation operation to be performed, an MMSE task instruction which when executed receives parameters for an MMSE operation and carries out the demodulation, and an MRC task instruction which when executed receives parameters for an MRC operation and carries out the demodulation.

In operation, processor 123 updates the WR_PTR in registers 306 of DEMOD WCSMSC 141, thereby indicating that there is at least one additional task instruction for the DEMOD WCSMSC 141 to execute. Generic task manager 305 determines whether there is new a task instruction in tightly coupled memory 125 for execution by DEMOD WCSMSC 141. If generic task manager 305 determines that there is another task instruction, then generic task manager 305 informs demod control logic 308 and works together with demod control logic 308 to read the task instruction across the second bus 127 and into a register of pre-task registers portion 309. Generic task manager 305 interprets the header of the task instruction, whereas demod control logic 308 interprets the remainder of the task instruction. Demod control logic 308, depending on the results of the interpretation of the task instruction, provides configuration parameters to other portions of DEMOD WCSMSC 141. Demod control logic 308 then causes those other portions to be triggered to perform various operations at various times such that the overall operation specified by and in the task instruction is carried out. Demod control logic 308 implements a different state machine for each task instruction. Upon entering and exiting states of the state machines, demod control logic 308 asserts the control signals. In design of DEMOD WCSMSC in one example, the state machines were defined in a hardware description language, and the description was synthesized to hardware logic using commercially available synthesis tools. Under control of task manager 300, IQ fetcher 301 reads from symbol buffer 144 to bring in IQ samples from locations designated by the task instruction. An incoming I sample value (real value) and its corresponding incoming Q sample value (imaginary value) together comprise an IQ sample. Channel estimation circuit 302 starts and begins estimating the channel, generating channel interpolation values, and aligns the generated interpolation results with the corresponding IQ samples so that the IQ samples and the associated interpolation results are supplied simultaneously to MMSE/MRC engine 303. There are two such IQ fetchers, one for each of antennas 101 and 102. MMSE/MRC engine 303 uses the two sets of IQ samples (one for each antenna) and the associated channel estimation values, performs a type of demodulation determined by the task instruction, and outputs a demodulation output value I, a demodulation output value Q, and an SNR value. Depending on the number of receive channels active and the number of layers, either MMSE demodulation or MRC demodulation is used. There may be one set of values going into engine 303 and one set going out, two sets going in and two sets going out, or two sets going in and one set going out. Write manager 304 is instructed by the task manager 300 where in tile buffer 145 to write each set of demodulation output value I, demodulation value Q, and SNR value. In this way, demod control logic 308 causes the DEMOD WCSMSC 141 to go one tone at a time, reading a tone from symbol buffer 144, doing demodulation, and writing the result into the tile buffer. When all such demodulation specified by the task instruction is finished, demod control logic 308 sets an end-of-task flag in status registers 306. If the task instruction indicates that a hardware strobe signal should be output from DEMOD WCSMSC 141 to initiate an operation in DDE WCSMSC 142, then a strobe signal will be asserted onto conductor 310. Conductor 310 extends from DEMOD WCSMSC 141 to DDE WCSMSC 142.

Figure 18:
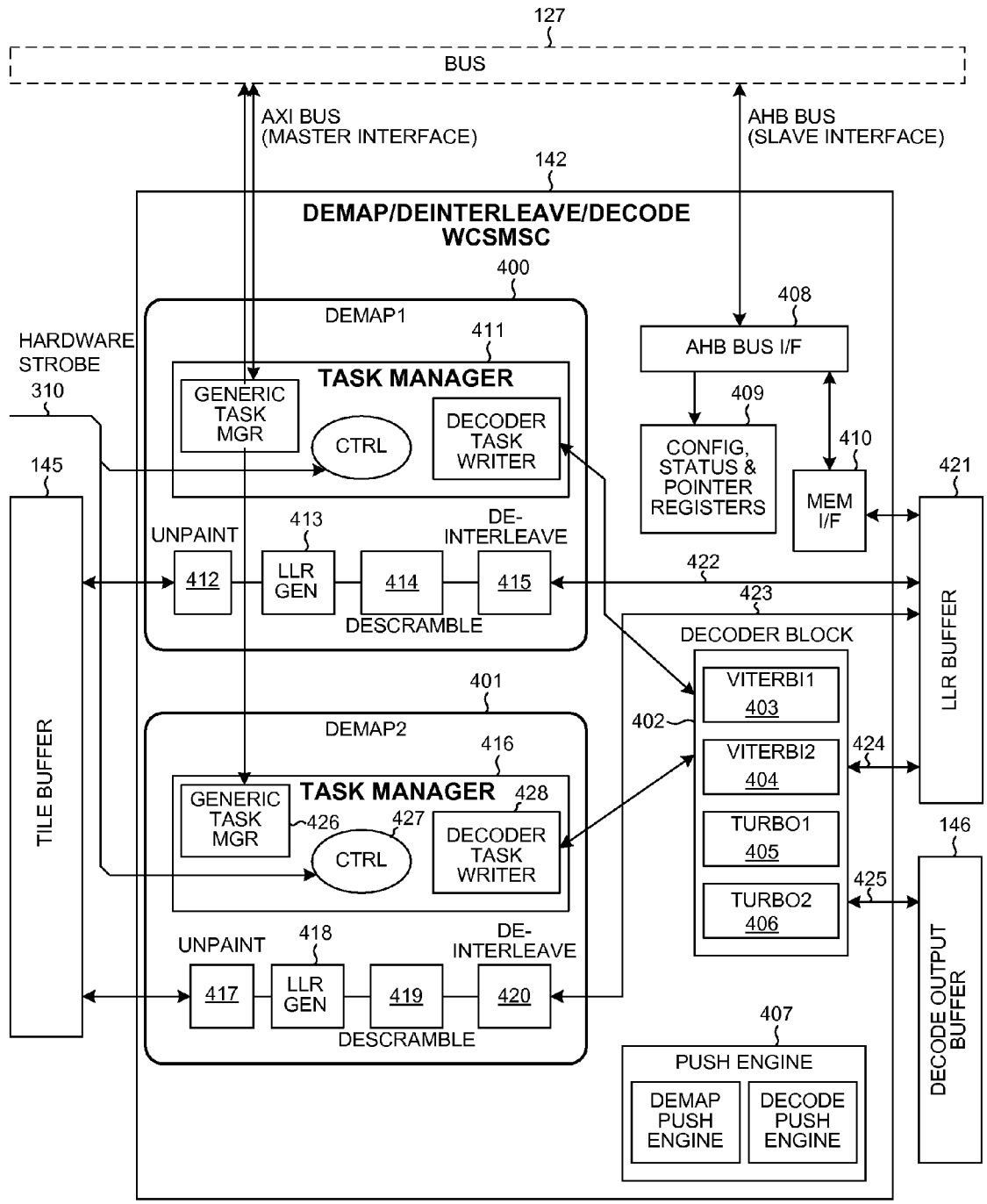
FIG. 18 is a block diagram of the DDE WCSMSC 142 of the digital baseband integrated circuit 104 of FIG. 4.

FIG. 18 is a diagram of DDE (Demap/Deinterleave/Decode Engine) WCSMSC 142. DDE WCSMSC 142 includes two demap engines DEMAP1 400 and 401, a decoder block 402 (including a first Viterbi decoder 403, a second Viterbi decoder 404, a first turbo decoder 405 and a second turbo decoder 406), a push engine 407, an AHB bus interface 408, registers 409 including configuration registers and status registers and pointer registers, and a memory interface 410. Each of the demap engines 400 and 401 has task manager functionality, but some of this functionality is shared. For example, the AHB bus interface 408, the pointer registers 409, and the push engine 407 are shared and are illustrated outside the demap engines in FIG. 18. Demap engine 400 includes a task manager circuit 411, and data stream processing circuits including an unpaint circuit 412, an LLR (Log Likelihood Ratio) generator 413, a descrambler 414, and a de-interleaver 415. Similarly, demap engine 401 includes task manager circuit 416, an unpaint circuit 417, an LLR generator 418, a descrambler 419, and a de-interleaver 420. The general flow of data is from tile buffer 145, through demappers 400 and 401, and into LLR buffer 421 via buses 422 and 423, then from LLR buffer 421 back into decoder block 402 via bus 424, through decoding, and out to decoder output buffer 146 via bus 425. Demap engine 400 has lower throughput capacity than demap engine 402, but demap engine 400 also has lower power consumption and is limited to the processing of control packets. Demap engine 400 has two read/write channels to LLR buffer 421 and can therefore output two LLR values at a time to LLR buffer 421 at two different PBRI (Pruned Bit Reversal Interleaver) addresses. Demap engine 401, on the other hand, is used for processing of data packets and has six read/write channels to LLR buffer 421. Demap engine 401 can simultaneously output and write into LLR buffer 421 six LLR values at six different PBRI addresses. Because demap engines 400 and 401 are to operate in parallel, each has its own task manager. A DDE task instruction may require information to be pushed back into the tightly coupled memory 125. DDE WCSMSC 142 therefore includes a push engine 407 that is coupled via AHB slave interface to second bus 127.

In operation, processor 123 places a task instruction into memory 125 in the DDE task list and updates the WR_PTR in registers 409. Generic task manager portion 426 of task manager 416 determines that a task instruction exists for execution by DDE WCSMSC 142. Generic task manager 426 reads the task instruction out of memory 125. A first portion of the DDE task instruction is for controlling demapping, whereas a second portion of the DDE task instruction is for controlling decoding. Control logic 427 uses the first portion to configure and control the demapping operation performed by blocks 417-420. Control logic 427 may employ a hardware trigger signal received from DEMOD WCSMSC 141 via signal conductor 310 to determine when it is to initiate certain operations as defined by the task instruction. Control logic 427 sends control signals to blocks 417-420 by control conductors (not shown). The demap/de-interleave operation may involve a reading of information from LLR buffer 421, some processing, and then a subsequent writing of information back into LLR buffer 421 in a HARQ (Hybrid Automatic Repeat Request) soft combining operation, or the demap/de-interleave operation may just involve a write into LLR buffer 421 without any soft combining. If the DDE task instruction indicated that results of the demap operation should be pushed to memory 125, then control logic 427 causes push engine 407 to push the indicated information across the second bus 127 to memory 125. After the demap/de-interleave operation has been performed and the results are in LLR buffer 421, then control logic 427 and decoder task writer 428 use the second portion of the task instruction to configure and control decoder block hardware that performs the decoding operation. Decoder task writer 428 triggers operation of decoder block 402 and at that time supplies decoder block 402 with the appropriate configuration and parameters to use in decoding. Decoder block 402 reads information to process out of LLR buffer 421, performs decoding in accordance with the second portion of the task instruction and as configured and controlled by control logic 427, and writes the result into decode output buffer 146. If the task instruction indicated that results of the decode operation should be pushed to memory 125, then control logic 427 causes push engine 407 to push the indicated information across the second bus 127 to memory 125. An example of information that might be push in this manner is CRC pass/fail information generated by decoder block 402.

Figure 19:
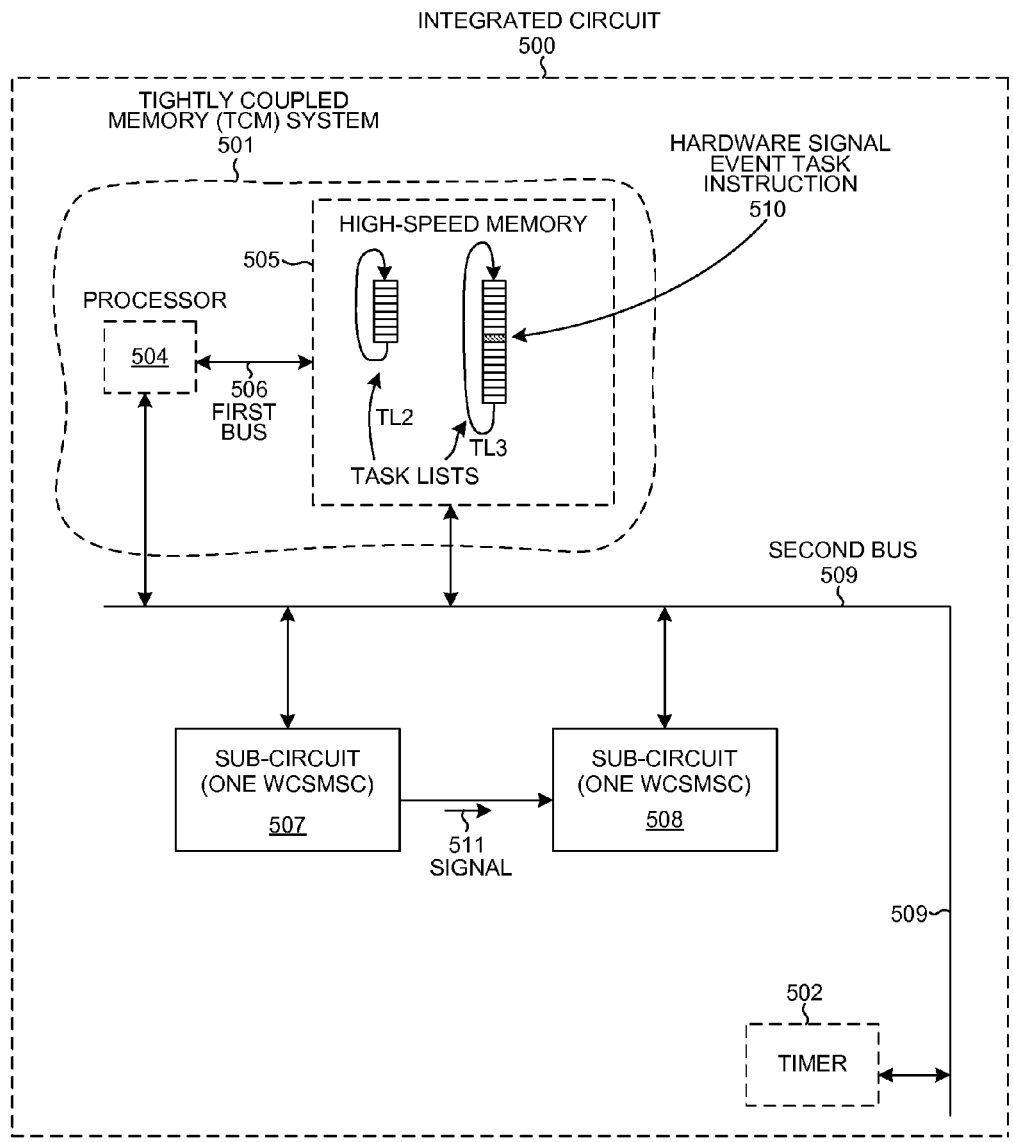
FIG. 19 is diagram of an integrated circuit in accordance with another aspect.

FIG. 19 is a diagram of an integrated circuit 500 in accordance with another novel aspect. Integrated circuit 500 comprises a Tightly Coupled Memory (TCM) system 501, a timer 502 and a plurality of sub-circuits 507, 508. The TCM system 501 comprises a processor 504 that is tightly coupled to a memory 505 via a first bus 506. The memory 505 stores a plurality of task lists, for example, TL2 and TL3. The plurality of sub-circuits includes sub-circuit 507 and sub-circuit 508. Each of the plurality of sub-circuits reads task instructions via a second bus 509 from a task list that corresponds to the sub-circuit and executes the task instructions. The task lists TL2 and TL3 include a push task instruction that when executed by a sub-circuit causes information to be written by the sub-circuit into the memory. The task lists TL2 and TL3 also include a configuration task instruction that when executed by a sub-circuit causes the sub-circuit to be configured in a particular way determined by the configuration task instruction. The task lists TL2 and TL3 also include a timestamp task instruction that contains a timer count field, where execution of the timestamp task instruction is started by a sub-circuit at a time indicated by a timer count value in the timer count field. The task lists TL2 and TL3 further include a hardware signal event task instruction 510. Execution of the hardware signal event task instruction 510 is started by the sub-circuit 508 upon assertion of a signal 511 generated by the sub-circuit 507. In the example of FIG. 19, the sub-circuits 507 and 508 are Wireless Communication System Modem Sub-Circuits (WCSMSCs).

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Although certain specific embodiments are described above for instructional purposes, the teachings of this patent document have general applicability and are not limited to the specific embodiments described above. The off-line task list architecture is not limited to use in realizing modems that communicate in accordance with any particular air interface standard such as LTE, UMB, or WiMAX, but rather the off-line task list architecture has general applicability to other air interface standards and more broadly to large digital systems that have multiple sub-circuits for performing different operations on a stream of data. Although an example is described above in which a processor writes task instructions into a tightly-coupled memory via a first bus, and task managers read task instructions out of the tightly-coupled memory via a second bus, this is but one example. In other examples, the processor and task managers access the memory that stores the task instructions via the same bus. Accordingly, various modifications, adaptations, and combinations of the various features of the described specific embodiments can be practiced without departing from the scope of the claims that are set forth below.

What is claimed is:

1. An integrated circuit comprising:
a memory that stores a first task list and a second task list, wherein the first task list includes task instructions, and wherein the second task list includes task instructions;
a first bus coupled to the memory;
a processor adapted to write task instructions into the memory across the first bus;
a first buffer;
a second buffer;
a third buffer;
a second bus coupled to the memory;
a first sub-circuit comprising:
a first processing circuit adapted to read first data from the first buffer, to process the first data thereby generating second data, and to write the second data into the second buffer; and
a first task manager adapted to read a first task instruction of the first task list from the memory across the second bus, to interpret the first task instruction, and to configure the first processing circuit based on a result of the interpreting; and
a second sub-circuit comprising:
a second processing circuit adapted to read the second data from the second buffer, to process the second data thereby generating third data, and to write the third data into the third buffer; and
a second task manager adapted to read a second task instruction of the second task list from the memory across the second bus, to interpret the second task instruction, and to configure the second processing circuit based on a result of the interpreting, and wherein the second task list includes a third task instruction, wherein the second task manager reads the third task instruction from the memory across the second bus, interprets the third task instruction, and executes the third task instruction by starting the second processing circuit upon assertion of a signal received from the first processing circuit.

2. An integrated circuit comprising:
a memory that stores a first task list and a second task list, wherein the first task list includes task instructions, and wherein the second task list includes task instructions;
a first bus coupled to the memory;
a processor adapted to write task instructions into the memory across the first bus;
a first buffer;
a second buffer;
a third buffer;
a second bus coupled to the memory;
a first sub-circuit comprising:
a first processing circuit adapted to read first data from the first buffer, to process the first data thereby generating second data, and to write the second data into the second buffer; and
a first task manager adapted to read a first task instruction of the first task list from the memory across the second bus, to interpret the first task instruction, and to configure the first processing circuit based on a result of the interpreting; and
a second sub-circuit comprising:
a second processing circuit adapted to read the second data from the second buffer, to process the second data thereby generating third data, and to write the third data into the third buffer; and
a second task manager adapted to read a second task instruction of the second task list from the memory across the second bus, to interpret the second task instruction, and to configure the second processing circuit based on a result of the interpreting, and wherein the second bus comprises:
a first sub-bus that couples the processor to pointer registers in the first task manager and the second task manager, wherein the processor writes pointer values across the first sub-bus into the pointer registers; and a second sub-bus that couples the memory to the first task manager and to the second task manager, wherein the first and second task managers read task instructions from the memory across the second sub-bus.

3. An integrated circuit comprising:
a memory that stores a first task list and a second task list, wherein the first task list includes task instructions, and wherein the second task list includes task instructions;
a first bus coupled to the memory;
a processor adapted to write task instructions into the memory across the first bus;
a first buffer;
a second buffer;
a third buffer;
a second bus coupled to the memory;
a first sub-circuit comprising:
   a first processing circuit adapted to read first data from the first buffer, to process the first data thereby generating second data, and to write the second data into the second buffer; and
   a first task manager adapted to read a first task instruction of the first task list from the memory across the second bus, to interpret the first task instruction, and to configure the first processing circuit based on a result of the interpreting; and
a second sub-circuit comprising:
   a second processing circuit adapted to read the second data from the second buffer, to process the second data thereby generating third data, and to write the third data into the third buffer; and
   a second task manager adapted to read a second task instruction of the second task list from the memory across the second bus, to interpret the second task instruction, and to configure the second processing circuit based on a result of the interpreting, wherein the first and second processing circuits are dedicated hardware circuits that do not fetch instructions.

4. An integrated circuit comprising:
a memory that stores a first task list and a second task list, wherein the first task list includes task instructions, and wherein the second task list includes task instructions;
a first bus coupled to the memory;
a processor adapted to write task instructions into the memory across the first bus;
a first buffer;
a second buffer;
a third buffer;
a second bus coupled to the memory;
a first sub-circuit comprising:
   a first processing circuit adapted to read first data from the first buffer, to process the first data thereby generating second data, and to write the second data into the second buffer; and
   a first task manager adapted to read a first task instruction of the first task list from the memory across the second bus, to interpret the first task instruction, and to configure the first processing circuit based on a result of the interpreting; and
a second sub-circuit comprising:
   a second processing circuit adapted to read the second data from the second buffer, to process the second data thereby generating third data, and to write the third data into the third buffer; and
   a second task manager adapted to read a second task instruction of the second task list from the memory across the second bus, to interpret the second task instruction, and to configure the second processing circuit based on a result of the interpreting, wherein the first task instruction includes a source address field, and a destination address field, wherein a source address value in the source address field indicates a source location in the first buffer, and wherein a destination address value in the destination address field indicates a destination location in the second buffer.

5. An integrated circuit comprising:
a memory that stores a first task list and a second task list, wherein the first task list includes task instructions, and wherein the second task list includes task instructions;
a first bus coupled to the memory;
a processor adapted to write task instructions into the memory across the first bus;
a first buffer;
a second buffer;
a third buffer;
a second bus coupled to the memory;
a first sub-circuit comprising:
   a first processing circuit adapted to read first data from the first buffer, to process the first data thereby generating second data, and to write the second data into the second buffer; and
   a first task manager adapted to read a first task instruction of the first task list from the memory across the second bus, to interpret the first task instruction, and to configure the first processing circuit based on a result of the interpreting; and
a second sub-circuit comprising:
   a second processing circuit adapted to read the second data from the second buffer, to process the second data thereby generating third data, and to write the third data into the third buffer; and
   a second task manager adapted to read a second task instruction of the second task list from the memory across the second bus, to interpret the second task instruction, and to configure the second processing circuit based on a result of the interpreting, wherein the processor writes a third task instruction into the first task list while the first sub-circuit is executing the first task instruction.

6. A method comprising:
storing a first task list and a second task list in a memory, wherein a processor, a first bus, and the memory form a Tightly Coupled Memory (TCM) system;
a first sub-circuit reading a first task instruction of the first task list from the memory across a second bus;
the first sub-circuit performing a first operation indicated by the first task instruction;
a second sub-circuit reading a second task instruction of the second task list from the memory across the second bus; and
the second sub-circuit performing a second operation indicated by the second task instruction, wherein the processor, the first bus, the second bus, the memory, the first sub-circuit and the second sub-circuit are parts of an integrated circuit, wherein the first operation involves the first sub-circuit writing data into a buffer, wherein the second operation involves the second sub-circuit reading the data out of the buffer, wherein the first task instruction includes a destination address field, and wherein a destination address value in the destination address field indicates a location in the buffer where the first sub-circuit writes the data.

7. A method comprising:
storing a first task list and a second task list in a memory, wherein a processor, a first bus, and the memory form a Tightly Coupled Memory (TCM) system;
a first sub-circuit reading a first task instruction of the first task list from the memory across a second bus;
the first sub-circuit performing a first operation indicated by the first task instruction,;
a second sub-circuit reading a second task instruction of the second task list from the memory across the second bus; and
the second sub-circuit performing a second operation indicated by the second task instruction, and wherein the processor, the first bus, the second bus, the memory, the first sub-circuit and the second sub-circuit are parts of an integrated circuit, wherein the first operation involves the first sub-circuit writing data into a buffer, wherein the second operation involves the second sub-circuit reading the data out of the buffer, wherein the second task instruction includes a source address field, and wherein a source address value in the source address field indicates a location in the buffer from which the second sub-circuit reads the data.

8. A method comprising:
storing a first task list and a second task list in a memory, wherein a processor, a first bus, and the memory form a Tightly Coupled Memory (TCM) system;
a first sub-circuit reading a first task instruction of the first task list from the memory across a second bus;
the first sub-circuit performing a first operation indicated by the first task instruction;
a second sub-circuit reading a second task instruction of the second task list from the memory across the second bus;
the second sub-circuit performing a second operation indicated by the second task instruction, wherein the processor, the first bus, the second bus, the memory, the first sub-circuit and the second sub-circuit are parts of an integrated circuit; and
storing a timestamp task instruction in the memory in the first task list, wherein the timestamp task instruction has a timer count field, wherein execution of the timestamp task instruction by the first sub-circuit is started at a time indicated by a value in the timer count field.

9. An apparatus comprising:
a memory that stores a first task list and a second task list;
a processor that is tightly coupled to the memory via a first bus;
a second bus;
first means for reading task instructions of the first task list out of the memory across the second bus and for performing first operations indicated by task instructions of the first task list, wherein the first means performs the first operations without fetching any instruction other than task instructions of the first task list, wherein the first means includes a first processing circuit and a first task manager, wherein the first processing circuit processes first data thereby generating second data; and
second means for reading task instructions of the second task list out of the memory across the second bus and for performing second operations indicated by task instructions of the second task list, wherein the second means performs the second operations without fetching any instruction other than task instructions of the second task list, wherein the second means includes a second processing circuit and a second task manager, wherein the second processing circuit processes the second data thereby generating third data, wherein neither the first processing circuit nor the second processing circuit fetches any instructions, and wherein the first means and the second means are Wireless Communication System Modem Sub-Circuits (WCSMSCs).

10. The apparatus of claim 9, further comprising:
a buffer, wherein the first means writes data into the buffer at locations indicated by a field in a task instruction of the first task list, and wherein the second means reads the data out of the buffer from locations indicated by a field in a task instruction of the second task list.

11. The apparatus of claim 9, wherein the processor is a processor taken from the group consisting of: a multi-core processor, and a multi-threaded processor.

12. The integrated circuit of claim 3, wherein the first buffer, the second buffer, and the third buffer are parts of a receive channel portion of a wireless communication modulator/demodulator (MODEM) integrated circuit.

13. The integrated circuit of claim 4, wherein the first buffer, the second buffer, and the third buffer are parts of a receive channel portion of a wireless communication modulator/demodulator (MODEM) integrated circuit.

14. An integrated circuit comprising:
a Tightly Coupled Memory (TCM) system comprising a processor that is tightly coupled to a memory via a first bus, wherein the memory stores a plurality of task lists;
a timer; and
a plurality of sub-circuits, wherein each sub-circuit reads task instructions via a second bus from a task list that corresponds to the sub-circuit and executes the task instructions, wherein the task lists include a push task instruction that when executed by a sub-circuit causes information to be written by the sub-circuit into the memory, wherein the task lists include a configuration task instruction that when executed by a sub-circuit causes the sub-circuit to be configured in a particular way determined by the configuration task instruction, wherein the task lists include a timestamp task instruction that contains a timer count field, wherein execution of the timestamp task instruction is started by a sub-circuit at a time indicated by a timer count value in the timer count field, wherein the task lists include a hardware signal event task instruction, wherein execution of the hardware signal event task instruction is started by a sub-circuit upon assertion of a signal generated by another sub-circuit, and wherein the sub-circuits are Wireless Communication System Modem Sub-Circuits (WCSMSCs).

15. An integrated circuit comprising:
a memory that stores a first task list and a second task list, wherein the first task list includes task instructions, and wherein the second task list includes task instructions;
a first bus coupled to the memory;
a processor adapted to write task instructions into the memory across the first bus;
a first buffer;
a second buffer;
a third buffer;
a second bus coupled to the memory;
a first sub-circuit comprising:
a first processing circuit adapted to read first data from the first buffer, to process the first data thereby generating second data, and to write the second data into the second buffer; and
a first task manager adapted to read a first task instruction of the first task list from the memory across the second bus, to interpret the first task instruction, and to configure the first processing circuit based on a result of the interpreting; and
a second sub-circuit comprising:
a second processing circuit adapted to read the second data from the second buffer, to process the second data thereby generating third data, and to write the third data into the third buffer; and
a second task manager adapted to read a second task instruction of the second task list from the memory across the second bus, to interpret the second task instruction, and to configure the second processing circuit based on a result of the interpreting, and wherein the first buffer is a sample buffer, the second buffer is a symbol buffer, and the third buffer is a tile buffer.

16. The apparatus of claim 9, further comprising:
a wall clock timer operatively coupled to the second bus.

17. The apparatus of claim 16, wherein the apparatus is an integrated circuit.

18. An apparatus, comprising:
means for storing a first task list and a second task list in a memory, wherein a processor, a first bus, and the memory form a Tightly Coupled Memory (TCM) system;
means for reading a first task instruction of the first task list from the memory across a second bus;
means for performing a first operation indicated by the first task instruction;
means for reading a second task instruction of the second task list from the memory across the second bus; and
means for performing a second operation indicated by the second task instruction, wherein the processor, the first bus, the second bus, the memory, the first sub-circuit and the second sub-circuit are parts of an integrated circuit, wherein the first operation involves the first sub-circuit writing data into a buffer, wherein the second operation involves the second sub-circuit reading the data out of the buffer, wherein the first task instruction includes a destination address field, and wherein a destination address value in the destination address field indicates a location in the buffer where the first sub-circuit writes the data.

19. An apparatus, comprising:
means for storing a first task list and a second task list in a memory, wherein a processor, a first bus, and the memory form a Tightly Coupled Memory (TCM) system;
means for reading a first task instruction of the first task list from the memory across a second bus;
means for performing a first operation indicated by the first task instruction;
means for reading a second task instruction of the second task list from the memory across the second bus; and
means for performing a second operation indicated by the second task instruction, and wherein the processor, the first bus, the second bus, the memory, the first sub-circuit and the second sub-circuit are parts of an integrated circuit, wherein the first operation involves the first sub-circuit writing data into a buffer, wherein the second operation involves the second sub-circuit reading the data out of the buffer, wherein the second task instruction includes a source address field, and wherein a source address value in the source address field indicates a location in the buffer from which the second sub-circuit reads the data.

20. An apparatus, comprising:
means for storing a first task list and a second task list in a memory, wherein a processor, a first bus, and the memory form a Tightly Coupled Memory (TCM) system;
means for reading a first task instruction of the first task list from the memory across a second bus;
means for performing a first operation indicated by the first task instruction;
means for reading a second task instruction of the second task list from the memory across the second bus;
means for performing a second operation indicated by the second task instruction, wherein the processor, the first bus, the second bus, the memory, the first sub-circuit and the second sub-circuit are parts of an integrated circuit; and
means for storing a timestamp task instruction in the memory in the first task list, wherein the timestamp task instruction has a timer count field, wherein execution of the timestamp task instruction by the first sub-circuit is started at a time indicated by a value in the timer count field.

21. A non-transitory computer-readable medium having stored thereon:
codes for causing a computer to store a first task list and a second task list in a memory, wherein a processor, a first bus, and the memory form a Tightly Coupled Memory (TCM) system;
codes for causing a computer to read a first task instruction of the first task list from the memory across a second bus;
codes for causing a computer to perform a first operation indicated by the first task instruction;
codes for causing a computer to read a second task instruction of the second task list from the memory across the second bus; and
codes for causing a computer to perform a second operation indicated by the second task instruction, wherein the processor, the first bus, the second bus, the memory, the first sub-circuit and the second sub-circuit are parts of an integrated circuit, wherein the first operation involves the first sub-circuit writing data into a buffer, wherein the second operation involves the second sub-circuit reading the data out of the buffer, wherein the first task instruction includes a destination address field, and wherein a destination address value in the destination address field indicates a location in the buffer where the first sub-circuit writes the data.

22. A non-transitory computer-readable medium having stored thereon:
codes for causing a computer to store a first task list and a second task list in a memory, wherein a processor, a first bus, and the memory form a Tightly Coupled Memory (TCM) system;
codes for causing a computer to read a first task instruction of the first task list from the memory across a second bus;
codes for causing a computer to perform a first operation indicated by the first task instruction;
codes for causing a computer to read a second task instruction of the second task list from the memory across the second bus; and
codes for causing a computer to perform a second operation indicated by the second task instruction, and wherein the processor, the first bus, the second bus, the memory, the first sub-circuit and the second sub-circuit are parts of an integrated circuit, wherein the first operation involves the first sub-circuit writing data into a buffer, wherein the second operation involves the second sub-circuit reading the data out of the buffer, wherein the second task instruction includes a source address field, and wherein a source address value in the source address field indicates a location in the buffer from which the second sub-circuit reads the data.

23. A non-transitory computer-readable medium having stored thereon:
   codes for causing a computer to store a first task list and a second task list in a memory, wherein a processor, a first bus, and the memory form a Tightly Coupled Memory (TCM) system;
   codes for causing a computer to read a first task instruction of the first task list from the memory across a second bus;
   codes for causing a computer to perform a first operation indicated by the first task instruction;
   codes for causing a computer to read a second task instruction of the second task list from the memory across the second bus;
   codes for causing a computer to perform a second operation indicated by the second task instruction, wherein the processor, the first bus, the second bus, the memory, the first sub-circuit and the second sub-circuit are parts of an integrated circuit; and
   codes for causing a computer to store a timestamp task instruction in the memory in the first task list, wherein the timestamp task instruction has a timer count field, wherein execution of the timestamp task instruction by the first sub-circuit is started at a time indicated by a value in the timer count field.

24. The integrated circuit of claim 1, wherein the first and second sub-circuits are Wireless Communication System Modem Sub-Circuits (WCSMSCs).

25. The integrated circuit of claim 2, wherein the first and second sub-circuits are Wireless Communication System Modem Sub-Circuits (WCSMSCs).

26. The integrated circuit of claim 5, wherein the first and second sub-circuits are Wireless Communication System Modem Sub-Circuits (WCSMSCs).

27. The method of claim 6, wherein the first and second sub-circuits are Wireless Communication System Modem Sub-Circuits (WCSMSCs).

28. The method of claim 7, wherein the first and second sub-circuits are Wireless Communication System Modem Sub-Circuits (WCSMSCs).

29. The method of claim 8, wherein the first and second sub-circuits are Wireless Communication System Modem Sub-Circuits (WCSMSCs).

30. The integrated circuit of claim 15, wherein the first and second sub-circuits are Wireless Communication System Modem Sub-Circuits (WCSMSCs).

* * * * *